(12) United States Patent
Abu Qahouq

(10) Patent No.: US 9,991,048 B2
(45) Date of Patent: Jun. 5, 2018

(54) WIRELESS POWER TRANSFER SYSTEMS AND METHODS

(71) Applicant: Board of Trustees of The University of Alabama, Tuscaloosa, AL (US)

(72) Inventor: Jaber A. Abu Qahouq, Tuscaloosa, AL (US)

(73) Assignee: The Board of Trustees of The University of Alabama, Tuscaloosa, AL (US)

(*) Notice: Subject to any disclaimer, the term of this patent is extended or adjusted under 35 U.S.C. 154(b) by 94 days.

(21) Appl. No.: 14/748,639

(22) Filed: Jun. 24, 2015

(65) Prior Publication Data
US 2015/0371771 A1    Dec. 24, 2015

Related U.S. Application Data

(60) Provisional application No. 62/016,178, filed on Jun. 24, 2014.

(51) Int. Cl.
*H01F 38/14* (2006.01)
*H02J 7/02* (2016.01)
(Continued)

(52) U.S. Cl.
CPC .............. *H01F 38/14* (2013.01); *H02J 7/025* (2013.01); *H02J 50/12* (2016.02); *H02J 50/20* (2016.02);
(Continued)

(58) Field of Classification Search
CPC . H01F 38/14; H02J 5/005; H02J 7/025; H02J 17/00; H02J 50/10; H02J 50/12;
(Continued)

(56) References Cited

U.S. PATENT DOCUMENTS 645,576 A    3/1900 Telsa
7,714,536 B1    5/2010 Silberg et al.
(Continued)

FOREIGN PATENT DOCUMENTS

WO    WO 2011/099106    *  8/2011 ............ B60L 11/182

OTHER PUBLICATIONS

International Search Report and Written Opinion, dated Sep. 16, 2015, in connection with International Application No. PCT/US2015/37342.
(Continued)

*Primary Examiner* — Levi Gannon
(74) *Attorney, Agent, or Firm* — Meunier Carlin & Curfman LLC

(57) ABSTRACT

Systems and methods for transmitting and receiving wireless power are disclosed. A transmitter may include one or more magnetic inductive coil(s) configured to transmit power, a plurality of drive loops, one or more switches connected to the plurality of drive loops, and a controller configured to connect or disconnect the drive loops using the one or more switches. A receiver may include one or more magnetic inductive coil(s) configured to receive power, a plurality of load loops, one or more switches connected to the plurality of load loops, and a controller configured to connect or disconnect the load loops using the one or more switches. The wireless power system may include inductive coils and RF antennas that are adaptively controlled and configured. A transmitter and/or a receiver may adaptively rotate, adjust orientation and/or location.

22 Claims, 18 Drawing Sheets

(51) Int. Cl.
*H02J 17/00* (2006.01)
*H04B 5/00* (2006.01)
*H02J 50/90* (2016.01)
*H02J 50/40* (2016.01)
*H02J 50/12* (2016.01)
*H02J 50/20* (2016.01)
*H02J 50/10* (2016.01)

(52) U.S. Cl.
CPC .............. *H02J 50/40* (2016.02); *H02J 50/90* (2016.02); *H04B 5/0037* (2013.01); *H04B 5/0087* (2013.01); *H02J 50/10* (2016.02)

(58) Field of Classification Search
CPC . H02J 50/20; H02J 50/40; H02J 50/90; H04B 5/0037; H04B 5/0087
USPC .......................................................... 307/104
See application file for complete search history.

(56) References Cited

U.S. PATENT DOCUMENTS

| | | | | |
|---|---|---|---|---|
| 9,071,063 | B2* | 6/2015 | Endo | H02J 5/005 |
| 2005/0190427 | A1* | 9/2005 | Steinsiek | B64G 1/428 |
| | | | | 359/237 |
| 2007/0061041 | A1 | 3/2007 | Zweig | |
| 2010/0052431 | A1* | 3/2010 | Mita | B60L 11/182 |
| | | | | 307/104 |
| 2010/0164297 | A1* | 7/2010 | Kurs | H01Q 1/248 |
| | | | | 307/104 |
| 2010/0314947 | A1* | 12/2010 | Baarman | H02J 5/005 |
| | | | | 307/104 |
| 2011/0018359 | A1 | 1/2011 | Wada et al. | |
| 2011/0133569 | A1 | 6/2011 | Cheon et al. | |
| 2012/0013198 | A1 | 1/2012 | Uramoto et al. | |
| 2012/0074891 | A1 | 3/2012 | Anderson et al. | |
| 2012/0080957 | A1 | 4/2012 | Cooper et al. | |
| 2012/0139358 | A1* | 6/2012 | Teggatz | H01F 38/14 |
| | | | | 307/104 |
| 2012/0153739 | A1 | 6/2012 | Cooper et al. | |
| 2012/0161529 | A1* | 6/2012 | Kamata | H02J 17/00 |
| | | | | 307/99 |
| 2012/0248890 | A1* | 10/2012 | Fukushima | H02J 5/005 |
| | | | | 307/104 |
| 2013/0310630 | A1 | 11/2013 | Smith et al. | |
| 2014/0375137 | A1* | 12/2014 | Ichikawa | H04B 5/0037 |
| | | | | 307/104 |

OTHER PUBLICATIONS

Karalis, A. et al., "Efficient wireless nonradiative mid-range energy transfer," Ann. Phys., vol. 323, No. 1, pp. 34-48, Jan. 2008.
Kurs, A. et al., "Wireless power transfer via strongly coupled magnetic resonances," Science, vol. 317, No. 5834, pp. 83-86, Jul. 2007.
Sample, A.P. et al., "Analysis, experimental results, and range adaptation of magnetically coupled resonators for wireless power transfer," IEEE Trans. Ind. Electron., vol. 58, No. 2, pp. 544-554, Feb. 2011.
Beh, T.C., et al., "Automated Impedance Matching System for Robust Wireless Power Transfer via Magnetic Resonance Coupling," IEEE Trans. Ind. Electron., vol. 60, No. 9, pp. 3689-3698, Sep. 2013.
Chen, L. et al., "An Optimizable Circuit Structure for High-Efficiency Wireless Power Transfer," IEEE Trans. Ind. Electron. ,vol. 60, No. 1, pp. 339-349, Jan. 2013.
Imura, T. et al., "Maximizing air gap and efficiency of magnetic resonant coupling for wireless power transfer using equivalent circuit and Neumann formula," IEEE Trans. Ind. Electron., vol. 58, No. 10, pp. 4746-4752, Oct. 2011.
Ho, S.L. et al., "A comparative study between novel witricity and traditional inductive magnetic coupling in wireless charging," IEEE Trans. Magn., vol. 47, No. 5, pp. 1522-1525, May 2011.
Kim, J. et al., "Optimal design of a wireless power transfer system with multiple self-resonators for an LED TV, IEEE Transactions on Consumer Electronics," vol. 58, No. 3, pp. 775-780, Aug. 2012.
Cannon, B.L. et al.,"Magnetic resonant coupling as a potential means for wireless power transfer to multiple small receivers," IEEE Trans. Power Electron., vol. 24, No. 7, pp. 1819-1825, Jul. 2009.
Fotopoulou, K. et al., "Wireless Power Transfer in Loosely Coupled Links: Coil Misalignment Model," IEEE Trans. Magn. vol. 47, No. 2, pp. 416-430, Feb. 2011.
Hui, S.Y.R. et al., "A Critical Review of Recent Progress in Mid-Range Wireless Power Transfer," IEEE Trans. Power Electron. No. 99, 2013.
Landis, G. A., "Reevaluating Satellite Solar Power Systems for Earth," IEEE 4th World Conference on Photovoltaic Energy Conversion, pp. 1939-1942, May 7-12, 2006.
Sahai, A. et al., "Optical wireless power transmission at long wavelengths," International Conference on Space Optical Systems and Applications (ICSOS), pp. 164-170, May 11-13, 2011.
Madawala, U. K. et al., "A bidirectional inductive power interface for electric vehicles in V2G systems," IEEE Trans. Ind. Electron., vol. 58, No. 10, pp. 4789-4796, Oct. 2011.
Wang, C.-S. et al., "Design considerations for a contactless electric vehicle battery charger," IEEE Trans. Electron., vol. 52, No. 5, pp. 1308-1314, Oct. 2005.
Egan, M. G. et al., "Power-factor-corrected single-stage inductive charger for electric vehicle batteries," IEEE Trans. Ind. Electron., vol. 54, No. 2, pp. 1217-1226, Apr. 2007.
Covic, G. A. et al., "A three-phase inductive power transfer system for roadway-powered vehicles," IEEE Trans. Ind. Electron., vol. 54, No. 6, pp. 3370-3378, Dec. 2007.
Budhia, M. et al., "Design and optimisation of magnetic structures for lumped inductive power transfer systems," in Proc. IEEE ECCE, pp. 2081-2088, 2009.
Zhang, Y. et al., "Frequency Decrease Analysis of Resonant Wireless Power Transfer," IEEE Transaction on Power Electronics, vol. 29, No. 3, pp. 1058-1063, Mar. 2014.
Ahn, D. et al., "A Study on Magnetic Field Repeater in Wireless Power Transfer," IEEE Trans. Ind. Electron., vol. 60, No. 1, pp. 360-371, Jan. 2013.
Zhong, W. et al., "General Analysis on the Use of Tesla's Resonators in Domino Forms for Wireless Power Transfer," IEEE Trans. Ind. Electron., vol. 60, No. 1, pp. 261-270, Jan. 2013.
Cheon, S. et al., "Circuit-model-based analysis of a wireless energy-transfer system via coupled magnetic resonances," IEEE Trans. Ind. Electron., vol. 58, No. 7, pp. 2906-2914, Jul. 2011.
Lee, S. G. et al., "Efficiency improvement for magnetic resonance based wireless power transfer with axial-misalignment," Electronics Letters, vol. 48 No. 6, pp. 339-340, Mar. 2012.

\* cited by examiner

WIRELESS POWER TRANSFER SYSTEMS AND METHODS

CROSS-REFERENCE TO RELATED APPLICATIONS

This application claims the benefit of U.S. Provisional Patent Application No. 62/016,178, filed on Jun. 24, 2014, entitled "WIRELESS POWER TRANSFER SYSTEMS AND METHODS," the disclosure of which is expressly incorporated herein by reference in its entirety.

BACKGROUND

Wireless power transfer can be used in a wide variety of applications directly power devices and/or recharge batteries. Two examples of wireless power transfer are magnetic induction and radio frequency (RF) energy transfer. Magnetic induction, which may also be referred to as inductive coupling, has a high transmission efficiency but usually for short distances. RF energy transfer, in contrast, has lower transmission efficiency but can work at longer distances.

A magnetic induction system can be designed for specific operating distances by, for example, selecting the sizes and shapes of the coils. By varying the system design, one magnetic system may have a good efficiency at a particular distance, such as less than one half of an inch, but performance may degrade significantly at longer distances. Another induction system may be configured to have better relative efficiency at a distance of, for example, several inches, but performance again will degrade at other ranges. As a result, magnetic induction systems are designed for a particular application with a fixed physical configuration. For example, a charging station may be configured to provide acceptable amounts of charging at the fixed distance that results from placing a toothbrush on the dedicated charging station. Placing the toothbrush even an inch away from the charging station though will not result in any charging.

Another drawback of magnetic inductive systems is that the transmitter coils and receiver coils must be both vertically and horizontally aligned. As a result, charging stations provide a physical holster that will hold the device to be charged in a particular configuration. Offsetting the device to be charged from the charging station even slightly results in rapid degradation of charging performance.

A device may be recharged using RF energy at much greater distances extending miles from the charging station, but the overall efficiency is usually lower.

Embodiments of the disclosed systems and methods overcome these and other problems.

SUMMARY

Systems and methods for transmitting and receiving wireless power are disclosed. A transmitter may include one or more magnetic inductive coil(s) configured to transmit power, a plurality of drive loops, one or more switches connected to the plurality of drive loops, and a controller configured to connect or disconnect the drive loops using the one or more switches. A receiver may include one or more magnetic inductive coil(s) configured to receive power, a plurality of load loops, one or more switches connected to the plurality of load loops, and a controller configured to connect or disconnect the load loops using the one or more switches. The wireless power system may include inductive coils and RF antennas that are adaptively controlled and configured. A transmitter and/or a receiver may adaptively rotate, adjust orientation and/or location.

DESCRIPTION

The described systems and methods may provide an adaptive electromagnetic and/or Radio Frequency (RF) charging station that, in one embodiment, can automatically reconfigure itself to optimize charging efficiency over differing ranges. Further, RF energy harvesting methods may be combined with magnetic induction to extend the range for wireless recharging applications.

Figure 1:
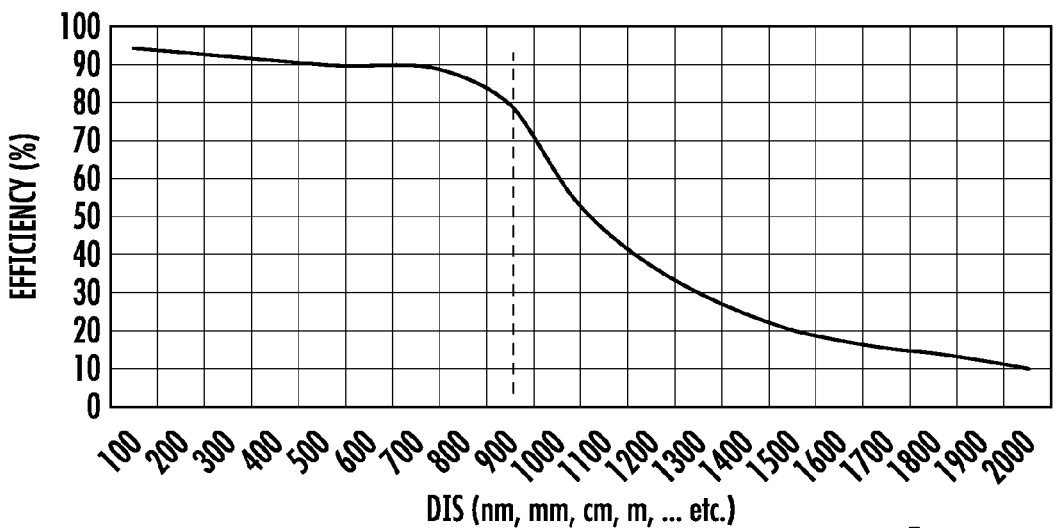
FIG. 1 illustrates an exemplary chart of transmission efficiency over exemplary distances.
Figure 2:
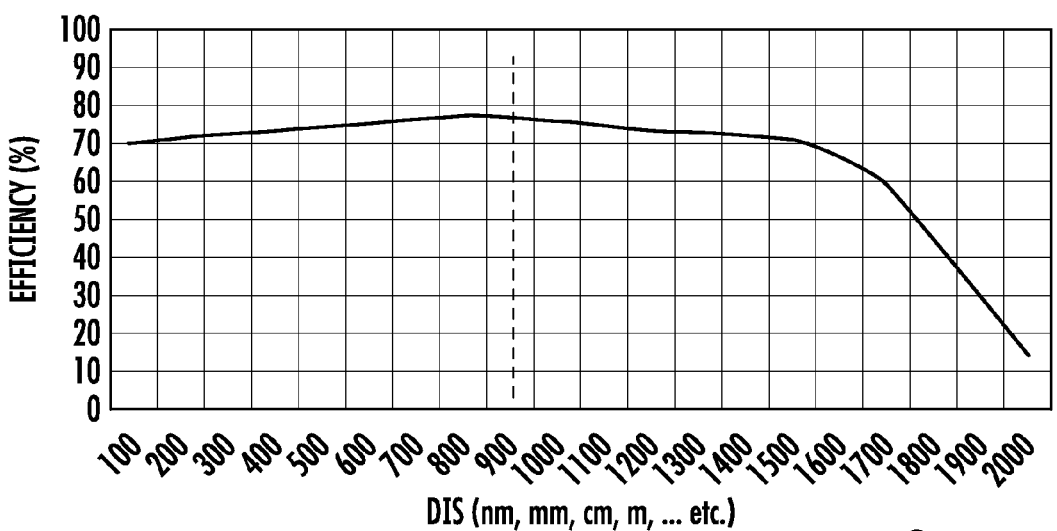
FIG. 2 illustrates an exemplary chart of transmission efficiency over exemplary distances.

FIGS. 1 and 2 illustrate examples of power transmission efficiency in traditional systems. A traditional resonant inductive wireless power transfer system includes a drive loop and a transmitter coil on the transmitting side, and a receiving coil and a load loop on the receiving side. In these systems, power transmission efficiency drops significantly as the distance varies, even if the resonant frequency is adjusted to its optimum value. FIG. 1 shows a system where the efficiency is relatively high, above ninety percent for example, at short distances, but drops significantly as the distance between the transmitter and receiver coils increases. FIG. 2 illustrates another system where the initial efficiency is lower at seventy to eighty percent but over a longer range before degrading. The distances shown in FIGS. 1 and 2 are exemplary as systems may be tuned for operation at other ranges.

Figure 3:
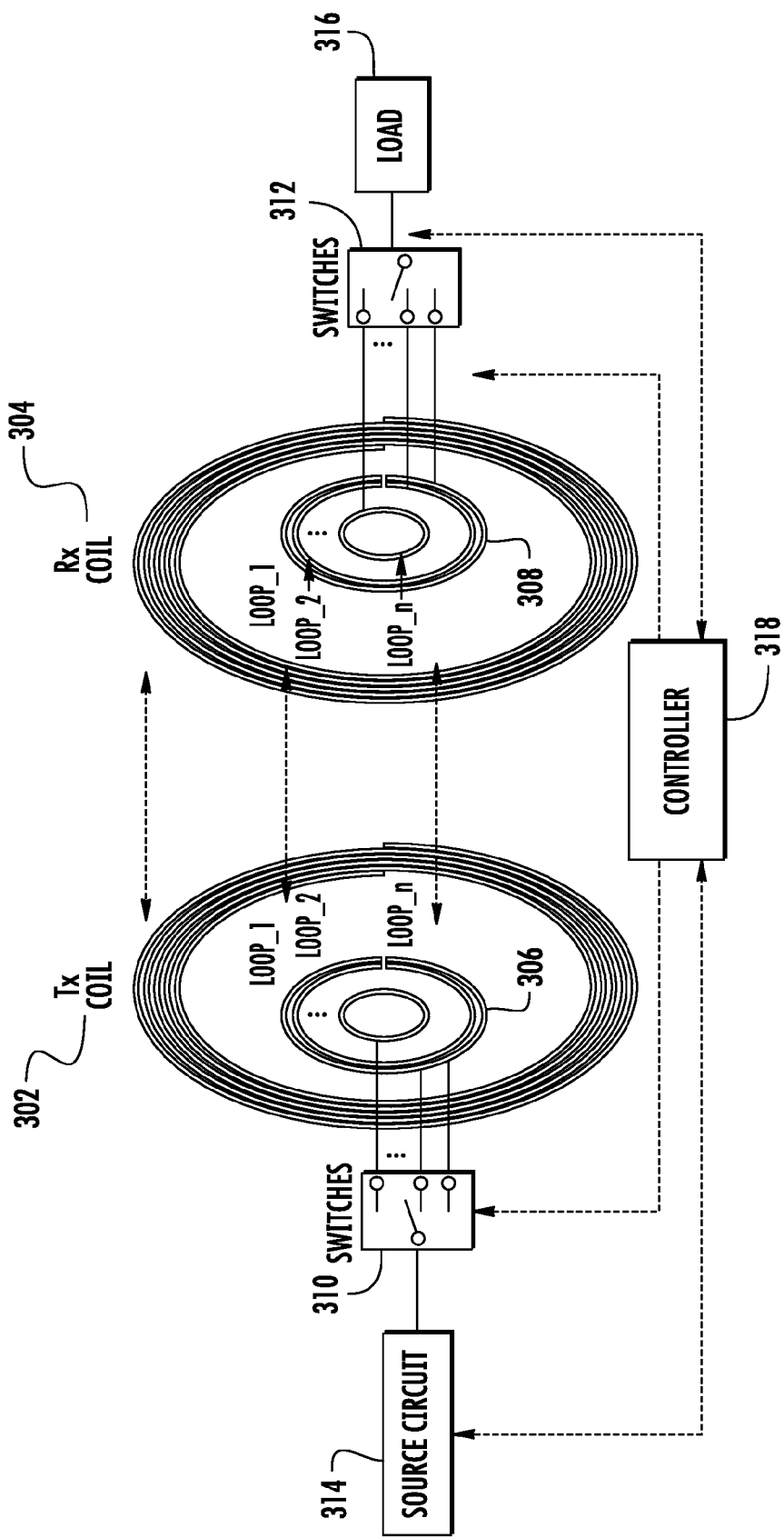
FIG. 3 illustrates a first exemplary system for wirelessly transmitting power.

FIG. 3 illustrates an exemplary system for adaptively configuring a wireless transmission system to provide increased efficiency over a greater range of distances while maintaining high efficiency at shorter distances. The system may be a wireless power transfer system with a transmitter coil 302 on a wireless power transmitter and a receiver coil 304 on a device that receives power. In the exemplary embodiment shown, the transmitter and receiver coils 302, 304 include four drive loops, although fewer or additional loops may also be used. The coils may be made from copper or any other material such as Carbon Nanotubes (CNTs) or nano wires. Carbon nanotubes may be used, for example, to reduce losses from the skin effect at high frequencies. In one exemplary embodiment, the coils may also be coated with other material, such as a magnetic material like ferrite. The transmitter also may use magnetic core materials near or around the coils.

A plurality of drive loops 306 may be included with the transmitter coil. Drive loops 306 may surround, be within, overlay, or be arranged near transmitter coil 302. The drive loops 306 may be connected and disconnected using switches 310. As a result, the number of drive loops connected to provide power from source circuit 314 for wireless transmission at any time may be varied. This allows the amount of power and frequency for transmission to be adaptively tuned for a variety of circumstances, providing increased transmission efficiency over a greater range of distances.

On the receiver side, a plurality of receiver loops 308 may also be controlled using switches 312 to receiver power and control frequency tuning Switches 312 may provide the received power to a load 316, which may be, for example, a battery, computing unit, or any other device that requires power. Drive loops 306 and load loops 308 may be, for example, planner coils, helix coils, circular, rectangular, or of any type or shape. The size and type of drive loops and load loops may be the same or different.

Controller 318 controls the power overall operation of the system. Controller 318 may be provided within the transmitter, the receiver, as a separate component, or within both the transmitter and the receiver. Controller 318 measures current power transmission and controls switches 310, 312 to optimize efficiency. For example, in one embodiment, by measuring the amount of power transmitted from source circuit 314 through the transmitter coil 302 and the amount of power actually received at the load 316 through receiver coil 304, the transmission efficiency may be calculated. If the efficiency is low, additional drive loops 306 may be supplied power by closing switches 310 to the additional drive loops to increase power transmission or alter the frequency of transmission. Controller 318 may therefore decide which of switches 310, 312 to connect and disconnect until optimum power transmission efficiency has been achieved. Controller 318 may also control switches 310, 312 by measuring just the amount of power received at load 316.

Various combinations may be tried by changing the configuration of switches 310, 312 until the amount of received power peaks.

In another exemplary embodiment, which may also be combined with the previous embodiment, controller 318 may measure the distance between the receiver coil 304 and the transmitter coil 302. The distance may be measured using a variety of different components, such as an ultrasound sensor or an infrared sensor. Based on the measured distance, controller 318 may control switches 310, 312 to connect or disconnect drive loops 306 and receiver loops 308 to adapt the parameters of power transmission.

Figure 3A:
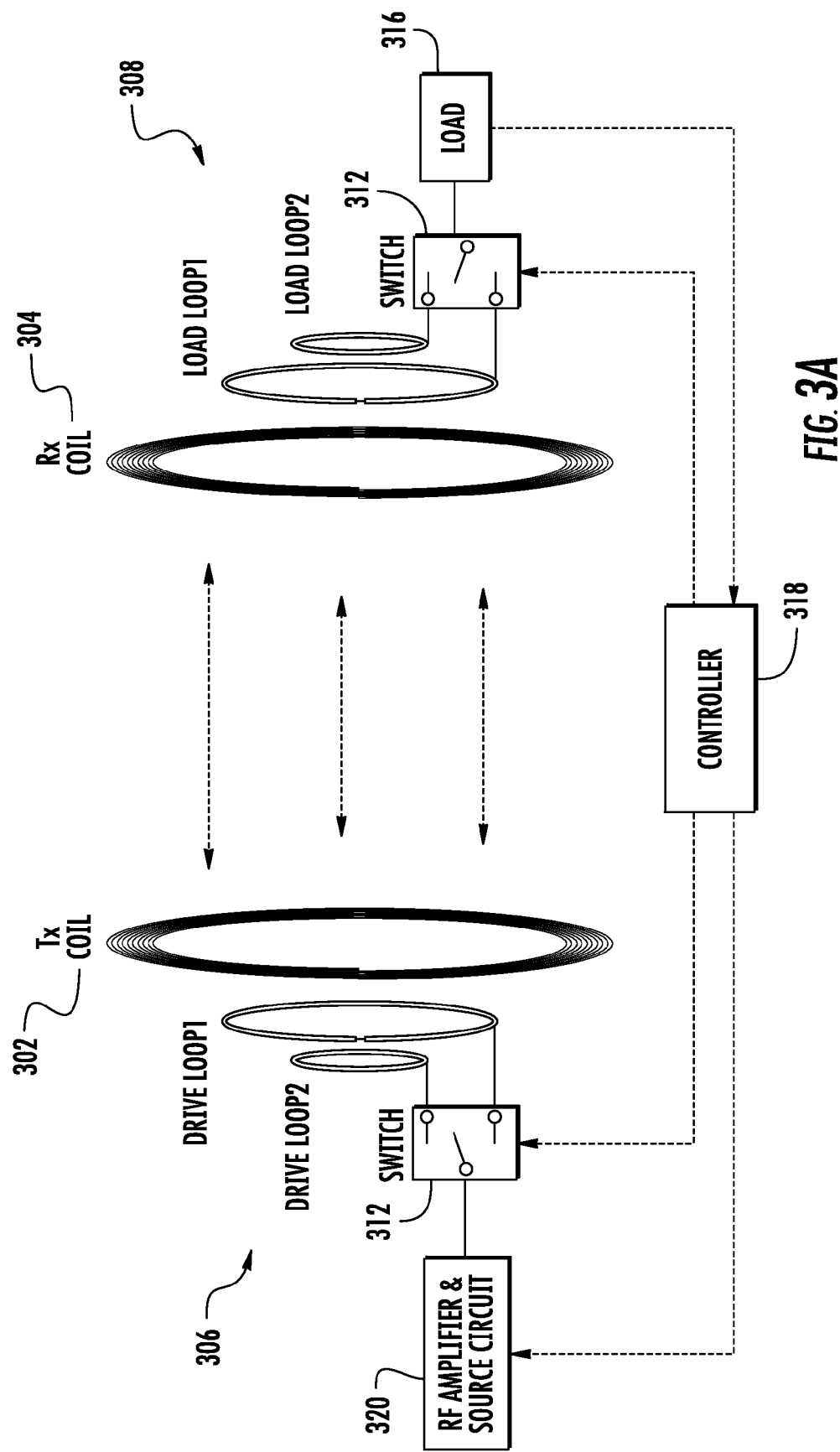
FIG. 3A illustrates a second exemplary system for wirelessly transmitting power.

FIG. 3A illustrates another exemplary system with two drive loops 306 and two load loops 308. Additional drive and load loops may be used. For example, four drive loops 306 and load loops 308 may be provided, and one, two, three, or all four may be connected using switches 310, 312. Each of the plurality of drive loops and load loops may have the same or different sizes, so that four exemplary drive or load loops may be slightly larger than each other. While the above description involved equal numbers of drive loops and load loops, a different number of drive loops (e.g., four) may be provided in a system with a different number of load loops (e.g., two). FIG. 3A also includes a combined RF amplifier and source circuit 320, which will be described in more detail below.

The adaptive power transmission system in FIGS. 3 and 3A therefore allow a similar system configuration to be used in a variety of application. The system of FIG. 3 allows efficient wireless charging in systems where the distance between the transmitter and receiver coil may not be fixed. For example, a car may include a power receiver that receives power from a transmitter placed in or on the ground. The car may not be parked in exactly the same spot each time, or cars may be different heights from the ground. By adaptively configuring wireless power transmission, the optimum transmission can be obtained without the need for a fixed cradle to hold the transmitter and receiver in the same orientation.

Figure 4:
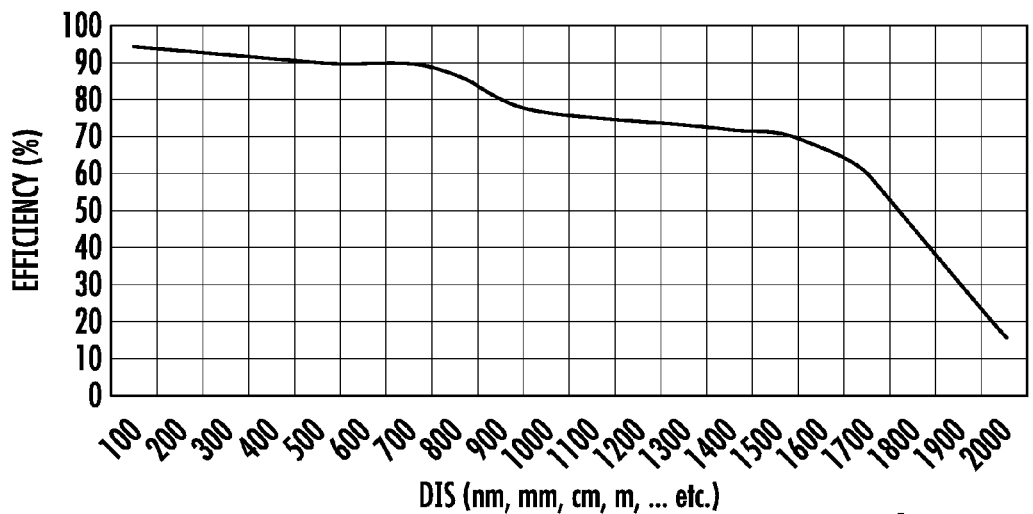
FIG. 4 illustrates an exemplary chart of transmission efficiency over exemplary distances.

FIG. 4 illustrates a resulting of efficiency resulting from the adaptively configurable system using switches. Efficiency may begin high (over ninety percent) at short distances and does not dramatically fall off as the distance increases. Instead, the range is greatly extended and efficiency over seventy percent can be maintained even as the distance increases. The efficiencies and distances shown in FIG. 4 are exemplary in nature and not limiting.

Figure 5:
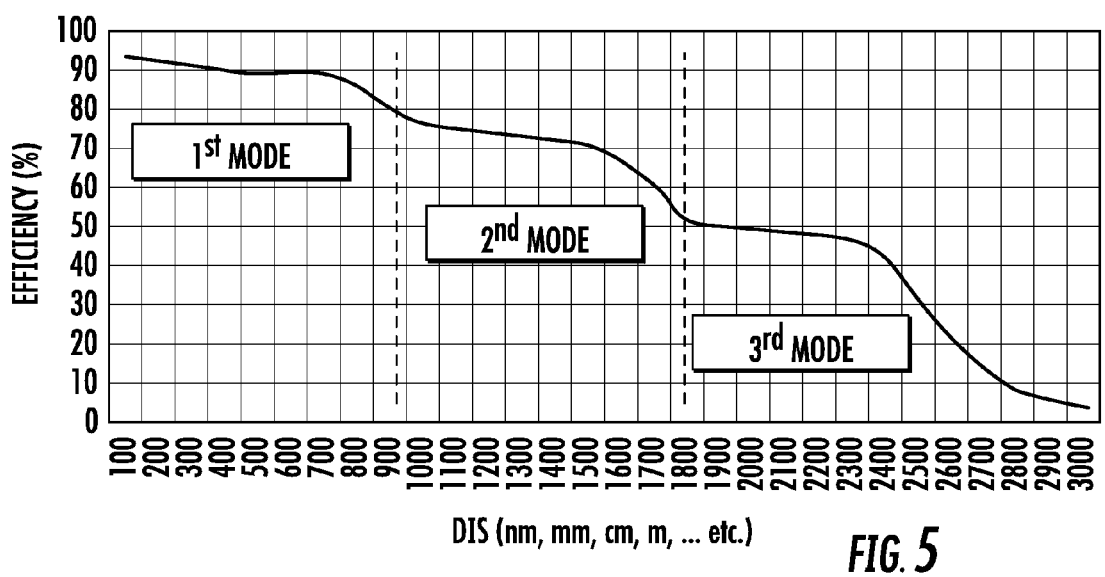
FIG. 5 illustrates an exemplary chart of transmission efficiency in three modes over exemplary distances.

FIG. 5 illustrates three operation modes as the distance increases, where each mode corresponds to different configurations of using switches 310, 312 to connect various drive loops 306 and receiver loops 308. The first mode results in high transmission efficiency above ninety percent at close range. As the distance increases, the controller may sense dropping efficiency and enter a second mode of operation once the transmission efficiency reaches, for example eighty percent. By engaging or disengaging switches, the efficiency in the second mode may remain high at increased distances whereas the efficiency otherwise would drop rapidly. Again, as the controller senses decreasing efficiency at longer distances, a third mode of operation may engage with a different configuration of switches. The third mode of operation may include longer distances and still maintain higher efficiency of around fifty percent than would otherwise be attainable in a system using a fixed configuration. Accordingly, higher efficiency is achieved at longer distances without affecting the high efficiency at shorter distances. The distances and efficiencies illustrated in FIG. 5 are also exemplary, as the system may be configured to provide higher efficiencies at different distances. Further, although three modes of operation are illustrates, fewer or additional operational modes may be configured to account for varying distances and transmission efficiencies.

The system may also have a different number of transmitter and receiver sides. For example, one or more transmitters may provide power to multiple receivers, and multiple transmitters may provider power to one or more receivers. The transmitter and receivers each may have multiple drive loops 306 and load loops 308, as described above. Where multiple transmitters are provided, each may be connected to the same or different sources 314. Likewise, multiple receivers may be connected to the same load 316 or different loads. Further, multiple transmitters 302 may be connected to drive loops 306 using switches 310, and multiple receivers 304 may be connected to load loops 308.

Figure 6:
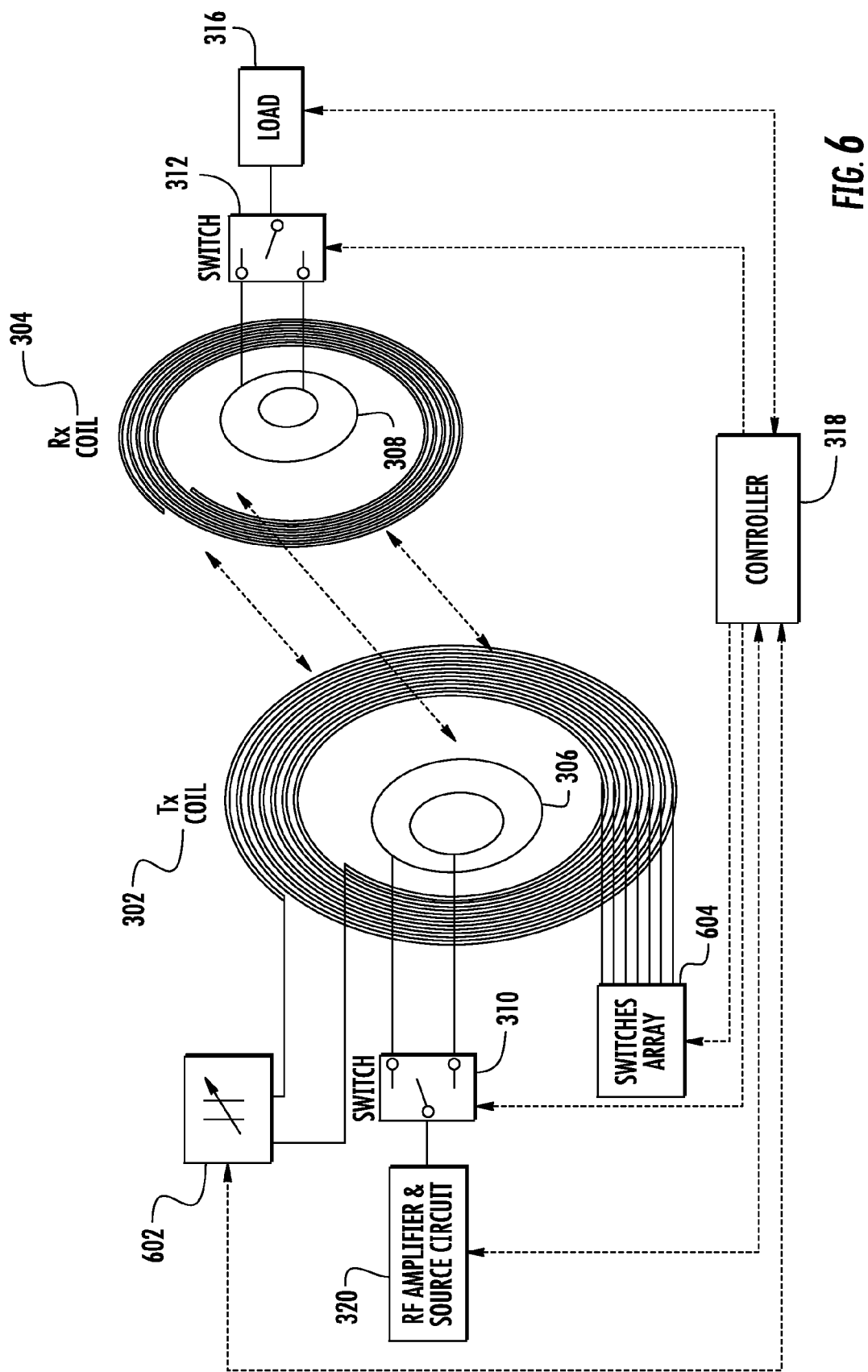
FIG. 6 illustrates a third exemplary system for wirelessly transmitting power.

FIG. 6 illustrates another exemplary system using a capacitor 602. Capacitor 602 may store additional power to be transmitted through drive loops 306 and transmitter 302. The value of capacitor 602 may also be varied by controller 318 to improve efficiency. Although illustrated as a single capacitor 602 connected to the transmitter 302, a capacitor may also be connected to the receiver coil 304. Further, one or more capacitors may be connected to drive loops 306, load loops 308, or any combination thereof.

In the example of FIG. 6 and the other examples herein, controller 318 may also connect, disconnect, or short different segment of transmitter and receiver coils 302, 304 to provide further system configurations that can optimize power transmission efficiency. Switch array 604 may be used to connect and disconnect various portions of the transmitter coil 302 to tune the power and frequency transmissions. Although not illustrated, a switch array may also be provided on the receiver coil 304. The controller can also adaptively configure switches 310 between different drive loops, load loops and/or capacitors based on the lateral or horizontal misalignment between the transmitter side and the receiver side. Drive loops 306 and load loops 308 may be on the same or different planes, and may be aligned parallel to each or at a different orientation or angle.

Figure 7:
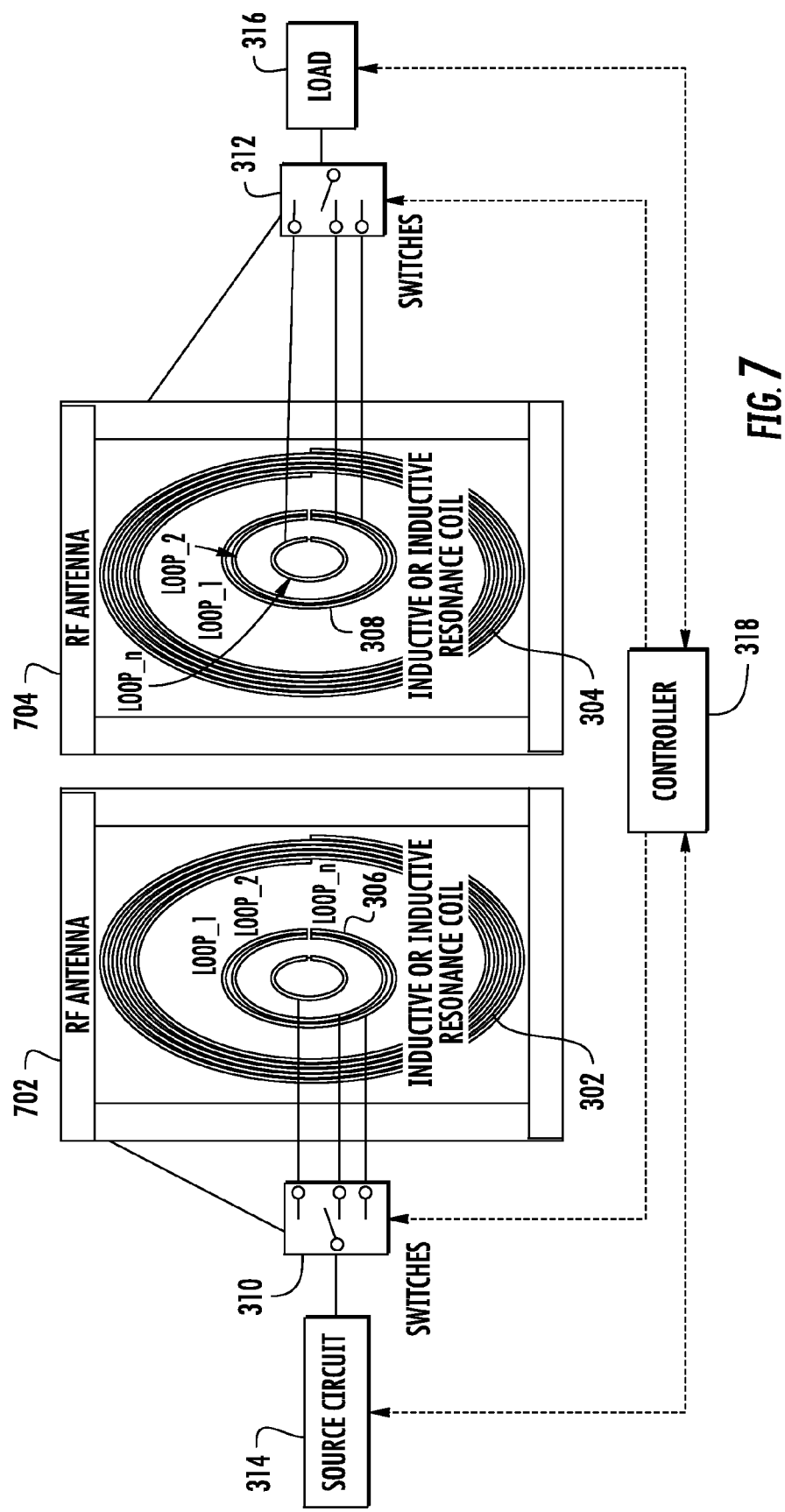
FIG. 7 illustrates a fourth exemplary system for wirelessly transmitting power.

FIG. 7 shows another exemplary system using a plurality of drive loops 306 and load loops 308 along with RF antennas 702, 704. Supplementing or substituting power transmission with RF antennas 702, 704 increases the range of power transmission between the transmitting and receiving devices. It also allows additional power to be transferred to supplement energy supplied through transmitter coil 302. The RF antennas at the receiver side can also harvest additional RF energy/power from the surroundings (coming for example for Wi-Fi routers, cell phone towers, and/or TV signals, among others) while receiving directed power from the transmitter. The RF antennas 702, 704 may be provided around, within, or in any other configuration relative to transmitter 302 and receiver 304. Further, the RF antennas may be part of or separate from the transmitter and receiver systems previously described. For example, although FIG. 7 illustrates a source circuit 314 providing power to both the drive loops 306 and the RF antenna 702, a separate power supply circuit may also provide power to RF antenna 702. The receiver may include a RF antenna 704 even though a transmitter does not include a RF antenna. In this exemplary embodiment, RF power transmission may come from a different source (not shown).

Figure 8:
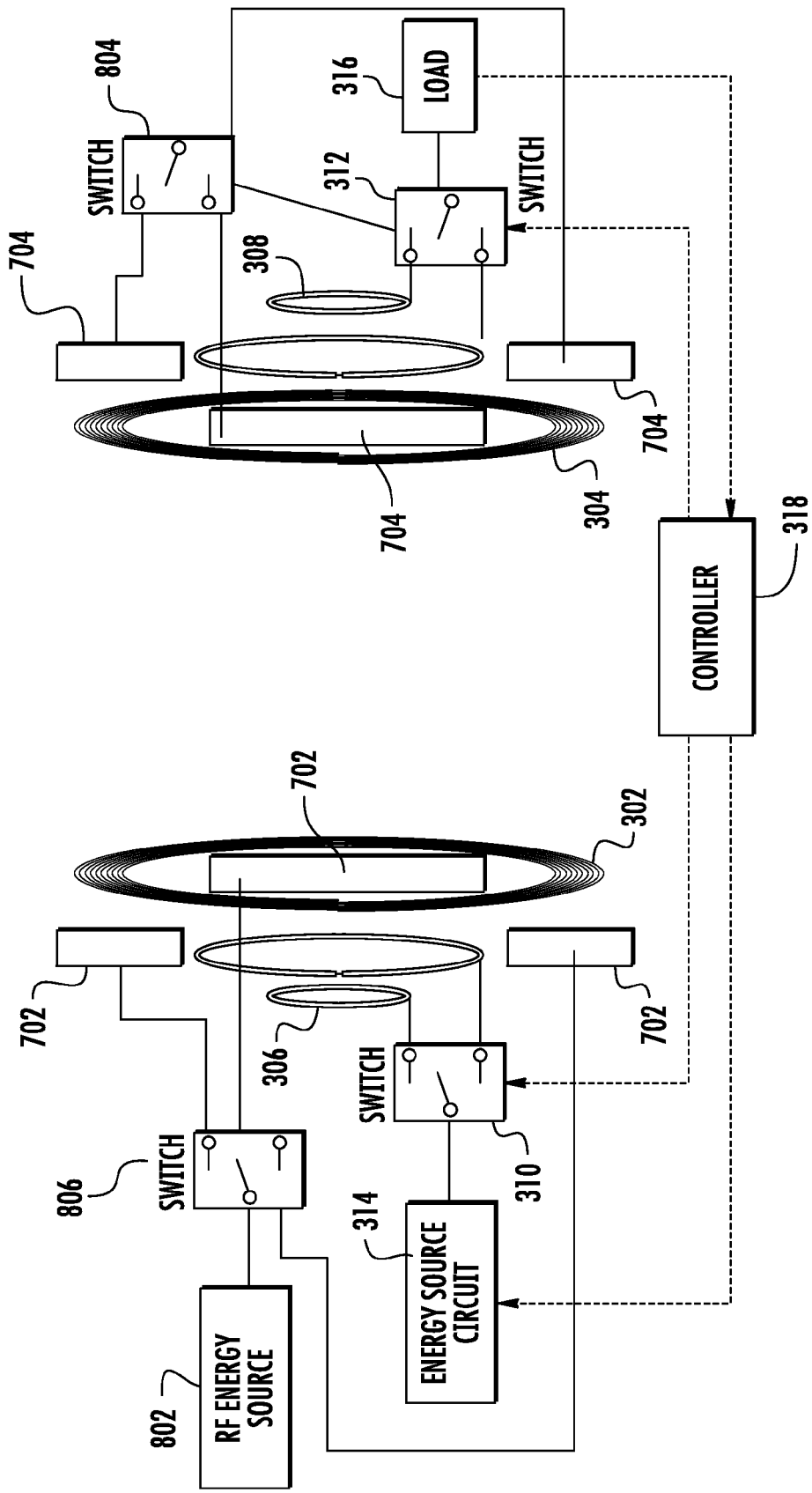
FIG. 8 illustrates a fifth exemplary system for wirelessly transmitting power.

FIG. 8 illustrates another exemplary embodiment using multiple RF antennas 702, 704 in various physical configurations both on the transmitter and receiver sides. Controller 318 may use switches 804, 806 to connect or disconnect one or more RF antennas. For example, as controller 318 senses that power transmission efficiency using the drive loops 306 and load loops 308 has fallen below a threshold, it may connect RF antennas 702, 704 to supplemental wireless power transfer using radio frequencies. In another example, controller 318 may determine that the distance between the transmitter and receiver has increased beyond a range that can provide effective inductive power transmission. Switches 310 may therefore engage additional drive loops 306 to boost inductive power transmission, and also may engage one or more RF antennas 702 that can transit radio frequency at much longer distances. Controller 318 may activate one or more RF antennas along with drive loops 306 as needed to boost wireless power transfer. Accordingly, controller 318 may send control commands to networks of switches to select what coils and antennas are connected to the energy source(s) and load(s) in a way the energy transfer maximizes for longer transmissions. Although switches 804, 806 are separate from switches 310, 312 in the example of FIG. 8, the transmitter and receiver sides may each use a single switch to control both the RF antennas and drive or load loops, respectively.

The exemplary systems in FIGS. 7 and 8 may therefore include multiple coils for inductive and inductive resonance energy transfer and reception. These coils may provide near and mid-range wireless energy transfer. At longer range, RF antennas may engage to supplement power transmission. In another embodiment, the RF antennas may provide wireless power transmission constantly to supplement inductive power transfer, even at close range. Further, at long ranges the drive loops and load loops may be disconnected so that the system relies on only RF wireless power transfer. One or more RF antennas may be configured specifically to support longer range wireless power transmission, providing a versatile system that can transfer wireless power. It should therefore be appreciated that controller 318 may engage or disengage switches 310, 312, 804, and 806 to provider power transfer in a variety of scenarios. In embodiments using both RF energy transfer and inductive energy transfer, the coils and antennas can be arranged in various configurations to optimize the coupling between them for energy transmission with higher efficiency even at longer distances.

In addition to using switches to control which drive loops and RF antennas are connected, the configuration of the coils, drive loops, and RF antennas may also be altered. For example, the surface area, cross section, angle, thickness, materials types, frequency of operation, and relative locations of components may be controlled. Controller 318 may determine which coils, drive loops, or RF antennas to connect and disconnect. The decision may be based on, for example, the power received by one or more loads, the power transmitted by the sources, the ratio between power transmitted and power received, or the overall efficiency of the system considering the coils, drive loops, antennas, loads, sources, and circuits. In another embodiment, a user may also request additional power or reduced power at the transmitting side, the receiving side, or through a separate interface. Other examples of system parameters that, in some embodiments, may influence control of the switches include the distance between the transmitting side and the receiving side, the angle between the transmission side and the receiving side, and any vertical or lateral misalignment between the transmitting side and the receiving side.

Figure 9:
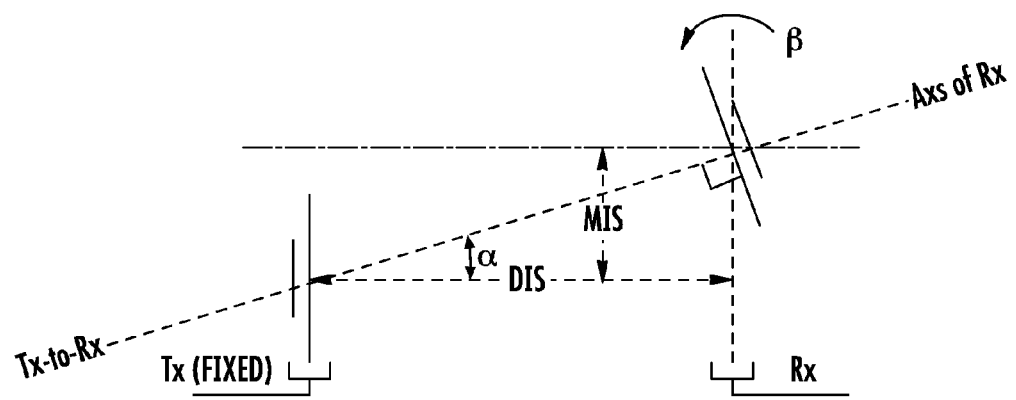
FIG. 9 illustrates an exemplary system for rotating a receiver.

Lateral misalignment also causes degradation of wireless inductive power transfer. FIG. 9 illustrates a system that overcomes the degradation in performance by changing the angle of the transmitter, the receiver, or both. As shown in FIG. 9, the receiver may be rotated along angle β toward the transmitter to provide more efficient power transmission for inductive charging. The axis of rotation is shown as having been rotated toward the center of the transmitter. Without this rotation, the transmitter and receiver would not be pointed toward each other and instead would be oriented on different planes. Inductive power transmission degrades rapidly down to zero and may then recover to a low efficiency when the transmitter and receiver are on different planes. The rapid degradation may be referred to as the transmission valley of death in systems that are not laterally aligned and do not rotate the transmitter or receiver. The system may be without drive loop(s), i.e. just the transmitting and receiving coils, or with drive loop(s).

In an exemplary embodiment of a transmitter being a wireless charging station under a parking spot, and the receiver being a receiver on an electric vehicle, the vehicle may be parked slightly offset in the parking spot so that the transmitter and receiver are not on the same plane. The receiver may also be in the bumper of the car and the transmitter can be in a stand or wall in front or back of the car. As another example, a wireless power transmitter may be placed on or under a desk to wirelessly power a laptop or components associated with a laptop, such as a wireless mouse, keyboard, printer, a cell phone, digital camera, or a monitor. The transmitter under the desk may not be perfectly aligned with each of these components as they are placed on different areas of the desk. By rotating the receivers in one or more of these exemplary components to angle toward the transmitter, wireless charging can be improved even when the transmitter and receiver are not perfectly aligned.

The amount to rotate the transmitter or receiver may be calculated based on the relative orientation of the two. As shown in FIG. 9, DIS represents the horizontal distance between the transmitter and receiver. MIS represents the lateral misalignment distance between the transmitter and receiver, and a represents the angle of misalignment.

The MIS and DIS distances may be measured using similar techniques as previously described, such as an infrared or ultrasound sensor, or any other method. In one embodiment, the receiver may be rotated along a plane until the maximum power transfer efficiency has been obtained. The receiver may angle its receiver and make minor changes, checking the transmission efficiency at each angle until the optimum angle has been identified for the orientation of the transmitter and receiver. A controller, as previously described, may detect transmission efficiency based on, for example, power transmitted, power received, the amount of power transferred verse received, or the distances between the transmitter and receiver, along with other techniques.

RF antennas do not suffer the same degradation of performance as inductive charging due to misalignment. Accordingly, switches and RF antennas may also be used in combination with the embodiment where the transmitter, receiver, or both are realigned to further boost wireless charging performance. As a result, the zero-coupling effect in laterally misaligned systems may be eliminated and the coupling factors may be boosted.

Figure 10:
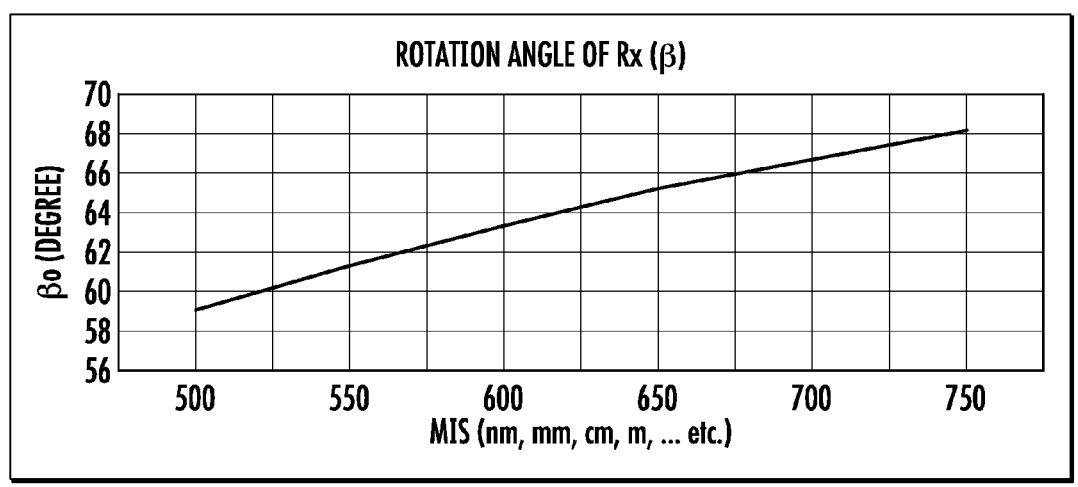
FIG. 10 illustrates an exemplary chart of the angle of rotation for a receiver.

FIG. 10 illustrates an exemplary diagram of rotating a receiver along an angle β. The angle may vary over varying exemplary distances as illustrated. In one embodiment, the position of the transmitter may be fixed, DIS and MIS may be fixed, and the angle β is tuned as shown. By turning the angle of the receiver toward the transmitter, the amount of fluxes passing through the receiver increase, which results in eliminating the zero-coupling point and increasing the transmission efficiency. The net flux passing through the receiver may determine the coupling factor and therefore the transmission efficiency. To maximize transmission efficiency after the elimination of the transmission valley of death, the rotation angle of the receiver may be tuned to an optimum value such that the maximum amount of flux passes through the receiver. The optimum rotation angle ($\beta_o$) is obtained when the axis of the receiver aligns to the line of transmitter to receiver, as shown in FIGS. 9 and 10. In one exemplary embodiment, maximum transmission efficiency exists when β is equal to α.

Figure 11A:
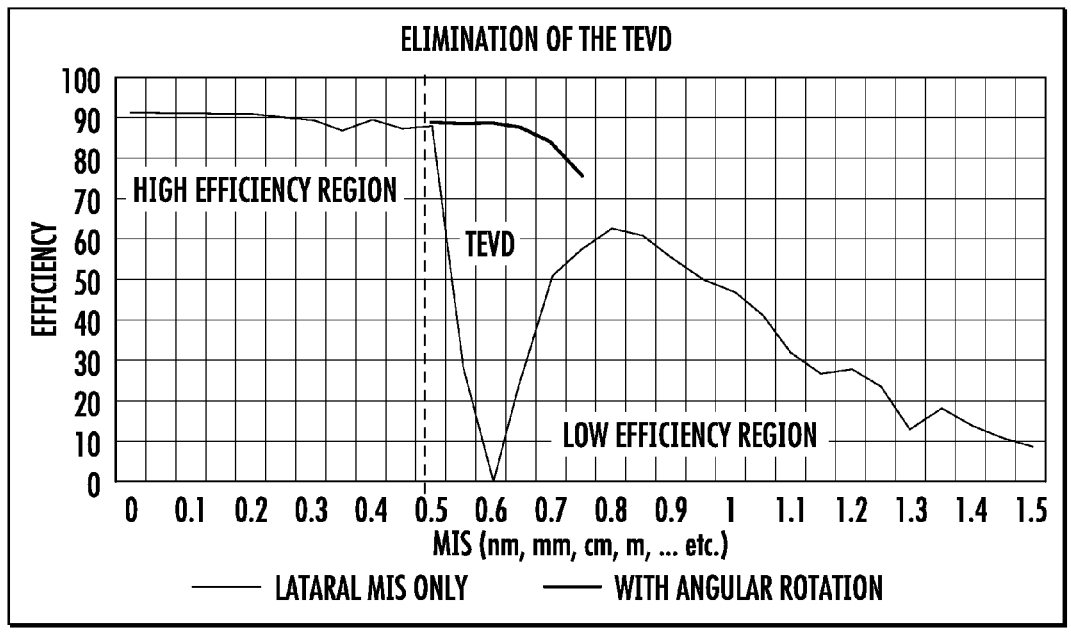
FIGS. 11A and 11B illustrate exemplary charts of the transmission efficiencies.
Figure 11B:
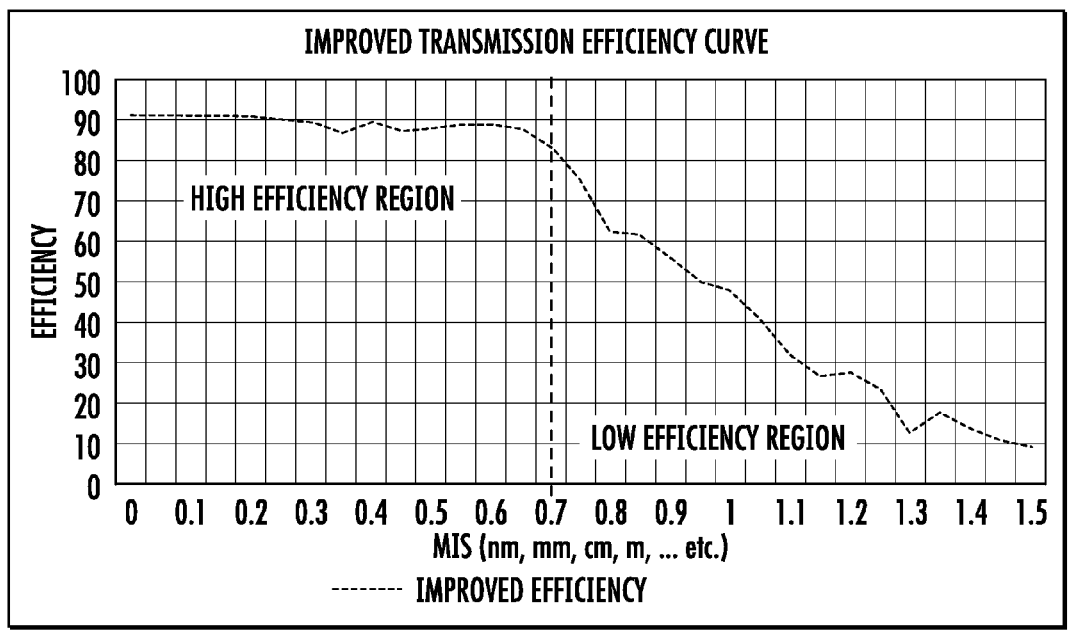

FIGS. 11A and 11B illustrate graphs showing how angular rotation of the receiver can eliminate the transmission valley of death that occurs due to lateral misalignment. The distances and efficiencies shown in FIGS. 11A and 11B are exemplary, as systems may be configured for a variety of circumstances. As shown in FIG. 11A, transmission efficiency in laterally misaligned systems drops off rapidly at a given distance, approaching zero in the valley of death, and then slightly recovers before degrading again. In FIG. 11A, an additional graph shows how the transmission efficiency can be improved with angular rotation where transmission others drops off rapidly. In FIG. 11B, a complete exemplary chart shows transmission efficiency once the angle of the receiver has been changed to be along the axis between the transmitter and receiver, eliminating the transmission valley of death and also extending the distance at which high efficiency transmissions occur.

The systems of using switches on multiple drive and load loops, adding RF power transmission, and employing angular rotation of the receiver, transmitter, or both may be implemented individually or in a combined single system. One exemplary application for these various embodiments includes flying robots or unmanned aerial vehicles (UAVs). UAVs require extended power to continue flying and carry out surveillance and other tasks. In military applications, having UAVs be sufficiently powered to travel long distances offers a significant advantage for intelligence gathering.

Figure 12A:
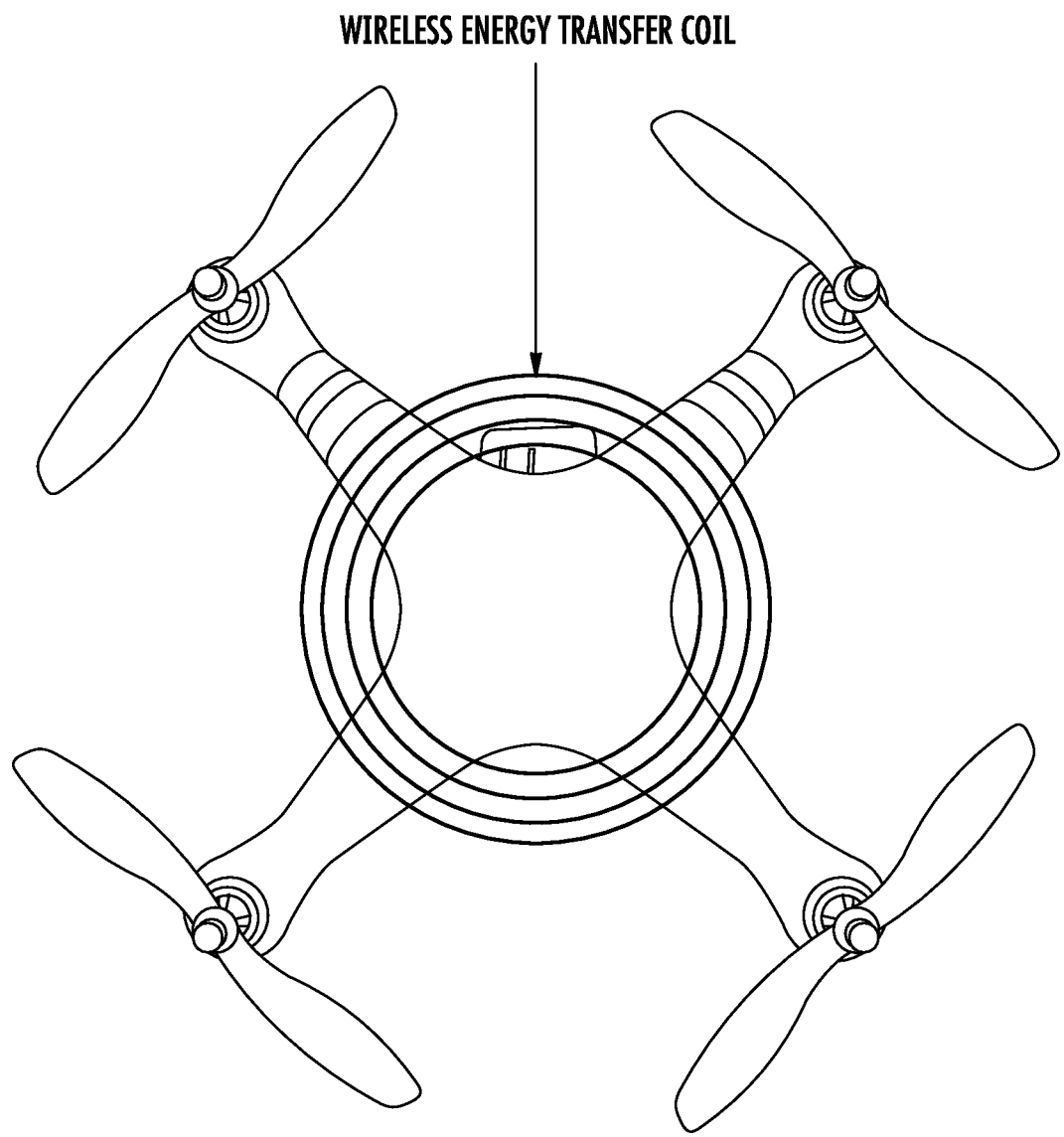
FIG. 12A illustrates an exemplary system using a wireless energy transfer coil.

A dedicated recharging UAV may hover above, below, or near a surveillance UAV to recharge it. The recharging UAV may include substantial battery packs that are charged on ground or through its own wireless inductive or RF charging systems. As the battery on a surveillance UAV depletes, a recharging UAV may deploy to recharge the surveillance UAV in the air without any service interruption. Also, surveillance UAVs may return to charging stations on the ground for charging without the need for a human to be present. These UAVs may also include solar cells to further boost performance and range. An example of a UAV with a wireless energy transfer coil is shown in FIG. 12A, which may include circuitry as previously described. The transfer coil may support power reception, power transmission, or both.

The UAV may also collaborate with each other to autonomously provide needed energy. In addition to obtaining energy while performing a function/job, UAVs may receive power while in low-power or sleep mode. Multiple robotic systems may exchange energy to support each other in a master-slave relationship in order to complete their intended tasks. In addition to having application with flying UAVs, other robots may also use the magnetic induction or RF recharging systems for a variety of applications, such as a rescue operation, security monitoring with camera, monitoring of plants in a farm or buildings, or weather monitoring, among others.

Figure 12B:
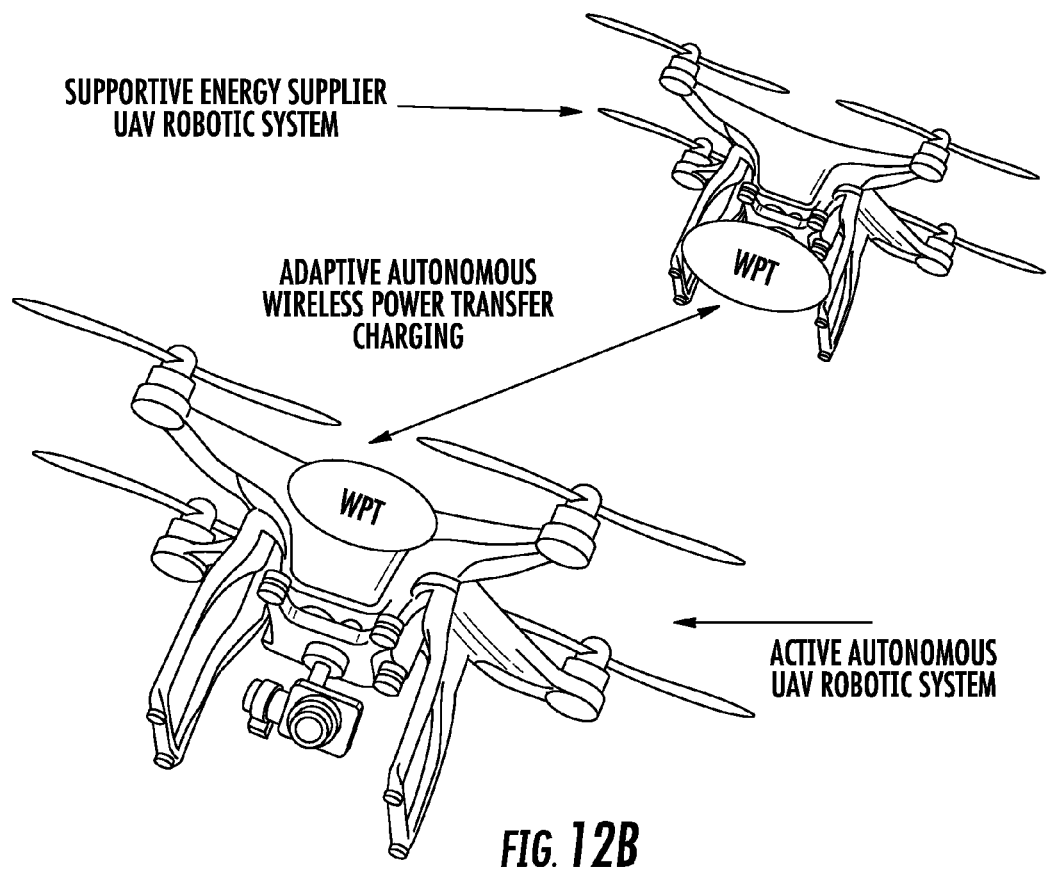
FIG. 12B illustrates an exemplary system where an unmanned aerial vehicle recharges another unmanned aerial vehicle.

The slave may synchronize with and track the master device as shown in FIG. 12B. The slave may carry energy storage load and include a wireless power transfer system that can perform both transmission and reception. The slave charges from an energy source, such as a ground energy charging station, and then charges the master while it is in service. The master device may include a power management controller which is able to determine when it needs energy, or predict when it will need energy, and request energy from the slave. Similar concepts also apply to ground based robots or vehicles.

Figure 13A:
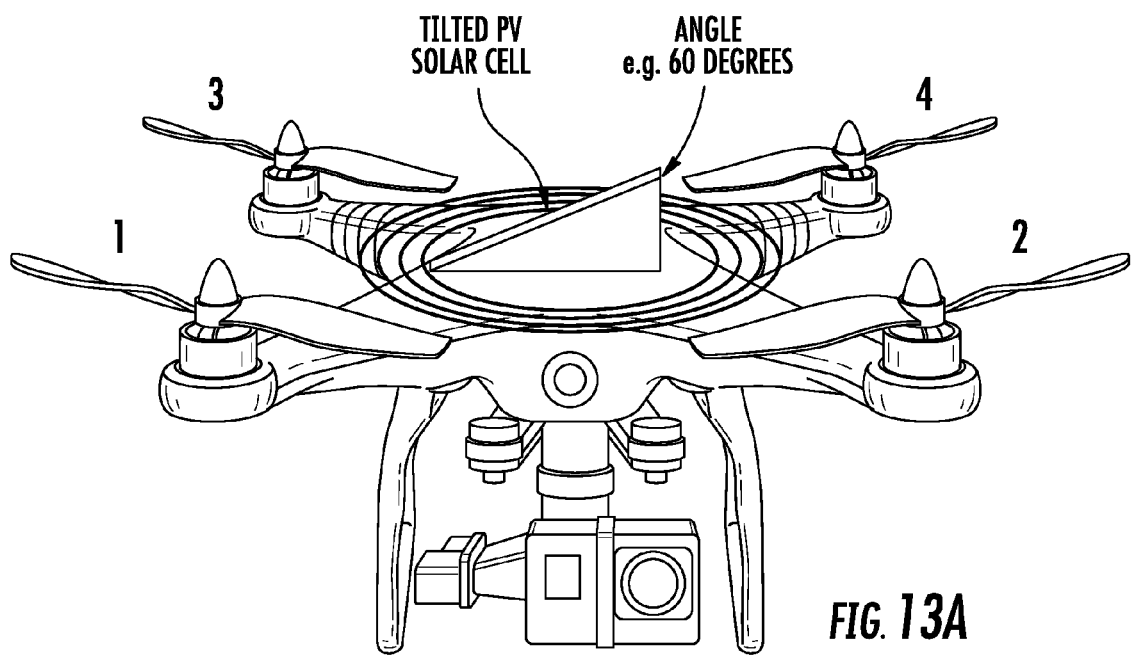
FIG. 13A illustrates an exemplary system using a wireless energy transfer coil with a tilting solar cell or panel.
Figure 13B:
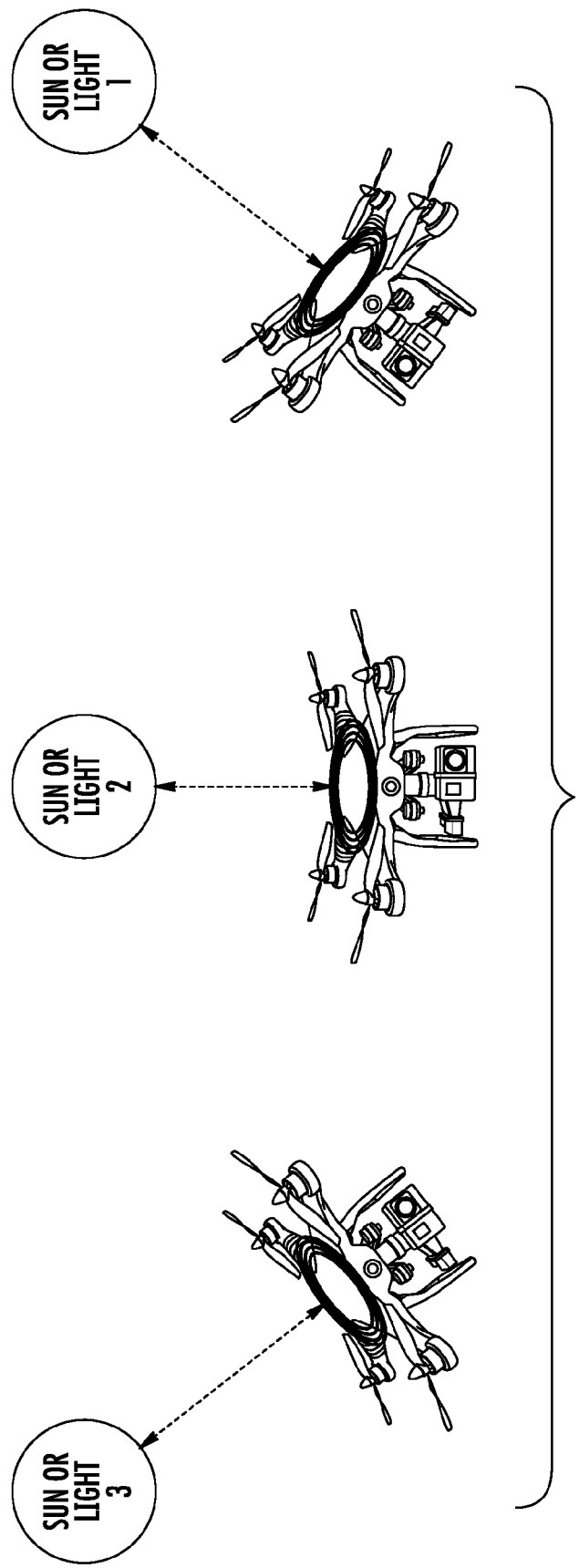
FIG. 13B illustrates another exemplary system using a wireless energy transfer coil where an unmanned aerial vehicle tilts during flight.

A photovoltaic (PV) solar cell or panel may also be provided on the master or slave. It may be embedded inside the empty space of the wireless power transfer coil or on top of the wireless power transfer coil as an additional energy source. The solar cell or panel may automatically tilt toward the sunlight to obtain maximum charging efficiency as shown in FIG. 13A. Instead of or in addition to tilting the solar panel, the UAV may tilt itself to fly at an angle that faces more directly toward the sun as shown in FIG. 13B. The robotic system position and orientation may be adjusted while taking into account the main function that the robotic system needs to achieve. For example, a controller may vary or modulate the speed of quad-rotors differently in order to keep the UAV tilted by an amount that will result in maximizing the harvested PV solar energy. The job/function of the UAV may, in one embodiment, be given priority by the controller in the orientation and tilt of the UAV over maximizing the harvested energy.

There are a number of exemplary application scenarios for wirelessly rechargeable UAVs. For example, an unmanned aerial robotic system may be used for wild life or fire monitoring, a rescue operation, infrastructure protection or monitoring and analysis, monitoring country boarders, weather monitoring, agricultural farms/crops monitoring and analysis, or traffic/transportation monitoring. As another example, autonomous (ground-based or aerial) robotic systems may live with and assist an aging, ill, or handicap citizen to assist around the home and monitor health. The master robot may wirelessly charge from a ground station (at home or in the backyard) or from another autonomous slave robot. A third example includes exploration in unmanned aerial robotic system being used for space applications on a planet to perform discovery and scientific missions. While several examples have been provided, there are many other exemplary applications for wirelessly recharging UAVs and other electronic devices.

The wireless recharging coil system described herein therefore has use in a wide variety of applications. TV remote controls, USB dongles, a wireless computer mouse or keyboard, wireless speakers, and monitors, for example, may all use the systems and methods with switching among multiple power sources and receivers to maximize wireless power transfer. The transmitter may be integrated into a computer, a base station, or any other appliance to transmit power wirelessly at a relatively close range. Further, the angle of a transmitter, receiver, or both may be adjusted to optimize power transfer in laterally misaligned systems. For longer range, or even for closer range, RF energy transfer may be used to supplement inductive charging to increase system charging performance.

As described herein, the wireless recharging coil system can adapt itself and its switches to extend transmission distance at higher efficiencies based on the power received and/or efficiency (among other parameters such as distance between the transmitter(s) and the receiver(s)). While the received power and/or efficiency can be measured or calculated by measuring both currents and voltages, these can also be obtained by other means. For example, the adaptive controller may operate by estimating the change direction in efficiency or power without the need to the exact or accurate value of power or efficiency (ii). For example, the direction of change (increase or decrease) in efficiency can be detected by using:

$$\eta \propto (V_L/V_S)^2,$$

where $V_L$ is the voltage at the receiver coil and/or antenna and $V_s$ is the source voltage or the receiver.

In one example, a drive loop may be excited by an alternating current (ac) source $V_S$ with output impedance $R_s$. The drive loop may have an inductance $L_D$, parasitic resistance $R_{pD}$ and capacitance $C_D$. A transmit coil may include a self-inductance $L_T$, a self-capacitance $C_T$, and a parasitic resistance $R_{pT}$. Similarly, a receiver coil may include of a self-inductance $L_R$, a self-capacitance $C_R$, and a parasitic resistance $R_{pR}$. A load loop may have an inductance $L_L$, parasitic resistance $R_{pL}$ and capacitance $C_L$. Inductors $L_D$ and $L_T$ are linked with coupling coefficient $k_{DT}$. $L_T$ and $L_R$ are linked with coupling coefficient $k_{TR}$, and $L_R$ and $L_L$ are linked with $k_{RL}$. Coupling coefficient is defined below where $M_{mn}$ is the mutual inductance between inductor $L_m$ and $L_n$. It should be understood that the above description is provided only as an example and that the circuit parameters are based on design. Additionally, this disclosure contemplates that resonance frequencies, coupling coefficients, and power transmission efficiencies of the circuit may be determined based on a given circuit design.

The problem of how to eliminate the transmission valley of death in laterally misaligned systems may be equivalent to the problem of how to enhance the magnetic coupling between the transmitter and the receiver in the transmission valley of death while the misalignment amount increases. For example, in a laterally misaligned system, altering the angle between the transmitter and receiver can improve power transmission efficiency of a wireless power transfer system.

Figure 14:
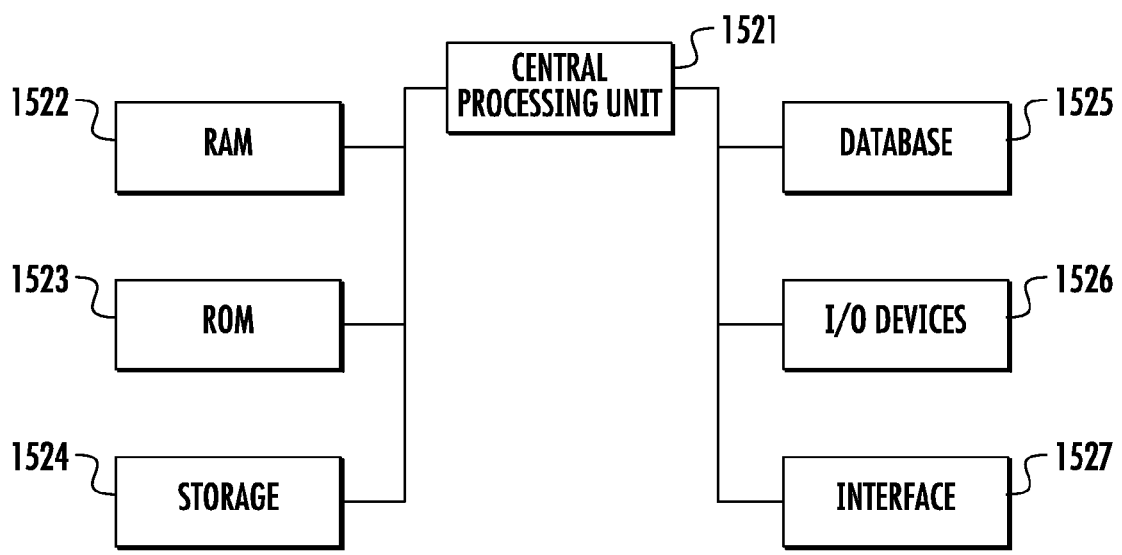
FIG. 14 illustrates an exemplary hardware configuration of a system.

FIG. 14 illustrates an exemplary processor-based computer system, on which the disclosed methods and processes may be implemented. The computer may include one or more hardware and/or software components configured to collect, monitor, store, analyze, evaluate, distribute, report, process, record, and/or sort information in the disclosed embodiments. For example, a controller may include one or more hardware components such as, for example, a central processing unit (CPU) 1521, a random access memory (RAM) module 1522, a read-only memory (ROM) module 1523, a storage 1524, a database 1525, one or more input/output (I/O) devices 1526, and an interface 1527. Alternatively and/or additionally, controller may include one or more software components such as, for example, a computer-readable medium including computer-executable instructions for performing a method associated with the exemplary embodiments. It is contemplated that one or more of the hardware components listed above may be implemented using software. For example, storage 1524 may include a software partition associated with one or more other hardware components of a controller 318. The controller may include additional, fewer, and/or different components than those listed above. It is understood that the components listed above are exemplary only and not intended to be limiting.

CPU 1521 may include one or more processors, each configured to execute instructions and process data to perform one or more functions associated with a controller.

CPU 1521 may be communicatively coupled to RAM 1522, ROM 1523, storage 1524, database 1525, I/O devices 1526, and interface 1527. CPU 1521 may be configured to execute sequences of computer program instructions to perform various processes. The computer program instructions may be loaded into RAM 1522 for execution by CPU 1521.

RAM 1522 and ROM 1523 may each include one or more devices for storing information associated with operation of CPU 1521. For example, ROM 1523 may include a memory device configured to access and store information associated with controller, including information for identifying, initializing, and monitoring the operation of one or more components and subsystems of controller. RAM 1522 may include a memory device for storing data associated with one or more operations of CPU 1521. For example, ROM 1523 may load instructions into RAM 1522 for execution by CPU 1521.

Storage 1524 may include any type of mass storage device configured to store information that CPU 1521 may need to perform processes consistent with the disclosed embodiments. For example, storage 1524 may include one or more magnetic and/or optical disk devices, such as hard drives, CD-ROMs, DVD-ROMs, or any other type of mass media device.

Database 1525 may include one or more software and/or hardware components that cooperate to store, organize, sort, filter, and/or arrange data used by controller and/or CPU 1521. For example, database 1525 may store distances between a transmitter and receiver, the angle of rotation for a transmitter, receiver, or both, the amount of power to transfer, which switches to connect or disconnect, and other processes described herein. It is contemplated that database 1525 may store additional and/or different information than that listed above.

I/O devices 1526 may include one or more components configured to communicate information with a user associated with controller. For example, I/O devices may include a console with an integrated keyboard and mouse to allow a user to input parameters associated with controller. I/O devices 1526 may also include a display including a graphical user interface (GUI) for outputting information on a monitor. I/O devices 1526 may also include peripheral devices such as, for example, a printer for printing information associated with controller, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1527 may include one or more components configured to transmit and receive data via a communication network, such as the Internet, a local area network, a workstation peer-to-peer network, a direct link network, a wireless network, or any other suitable communication platform. For example, interface 1527 may include one or more modulators, demodulators, multiplexers, demultiplexers, network communication devices, wireless devices, antennas, modems, and any other type of device configured to enable data communication via a communication network.

Figure 15:
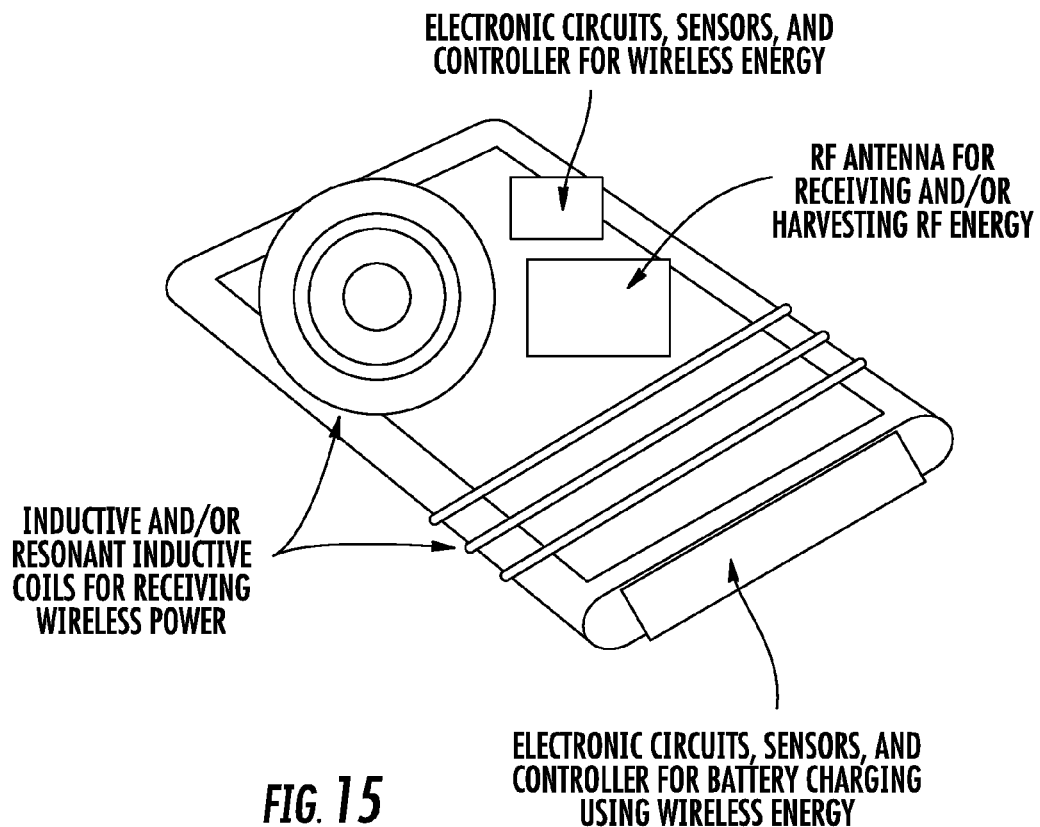
FIG. 15 illustrates an exemplary embodiment of integrating wireless power charging into a battery.

FIG. 15 illustrates another exemplary embodiment with an integrated battery system with wireless energy receivers and chargers. The battery may still receive wireless energy even after is taken out of a device, such as a phone. Therefore, in one exemplary embodiment, the battery may be charged wirelessly when it is placed in the device that is equipped with wireless charger, and also when it is unplugged from the device. As illustrated in FIG. 15, the battery structure may include one or more of RF antenna(s), inductive and resonant coils, and electronics for charging. The coils and RF energy transfer may operate in the manner as previously described. The integrated battery may harvest RF energy from surroundings, receive RF energy from a RF transmitter, and/or can receive inductive wireless energy. The coils may be integrated in the casing of the battery, at one or more sides, or around the battery. The RF antenna may be part of the battery casing or inside the battery itself. In one exemplary embodiment, the body of the battery itself may be used as an RF energy receiving antenna.

Figure 16:
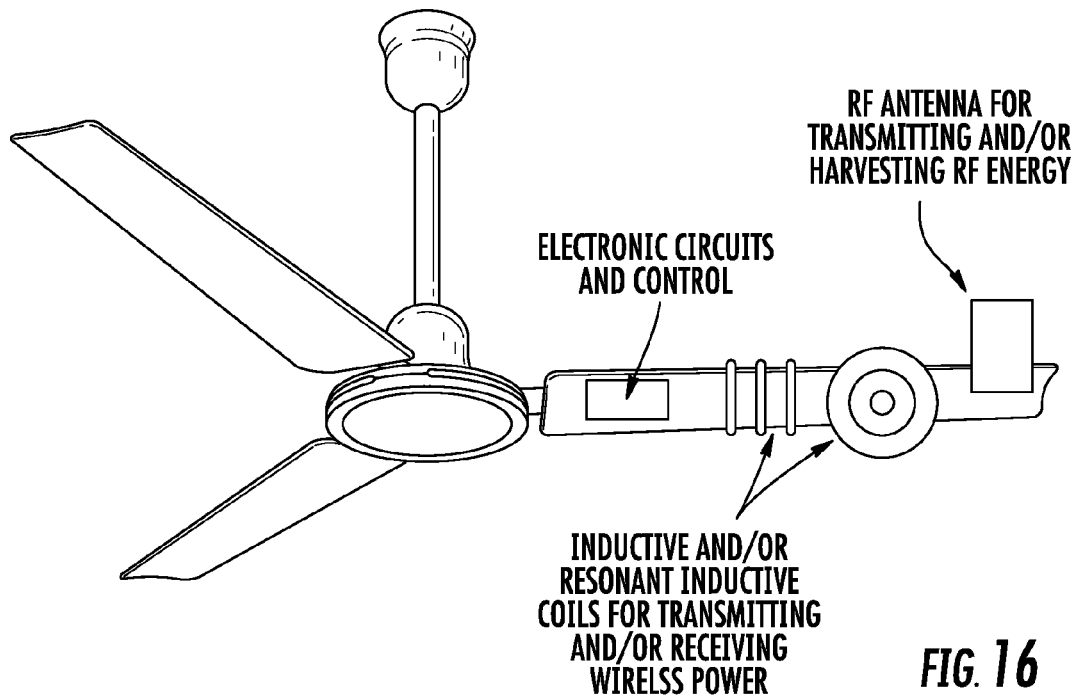
FIG. 16 illustrates an exemplary embodiment of integrating wireless power transfer into a fan.

FIG. 16 illustrates another exemplary embodiment where the inductive and resonant coils and/or RF antennas may be integrated in a ceiling fan, wall fan, or any other fan type, or similar system. The fan blades may be oriented in a way that when the fan is rotating the wireless energy coverage area is increased. The fan may rotate as it is used so as to cover a larger area in the room with high efficiency wireless power. The fan also may be controlled to place the blade that has the wireless energy system in a stationary desired position. For example, the fan may rotate such that the blade is at the left side of the room instead of the right side when devices to be charged are located at the left side. In another example, the blade itself may tilt around its axis to a desired position. While illustrated as having a wireless charging system on one blade, it will be appreciated that the wireless transmitters may be placed on one or more blades to maximize coverage.

Figure 17:
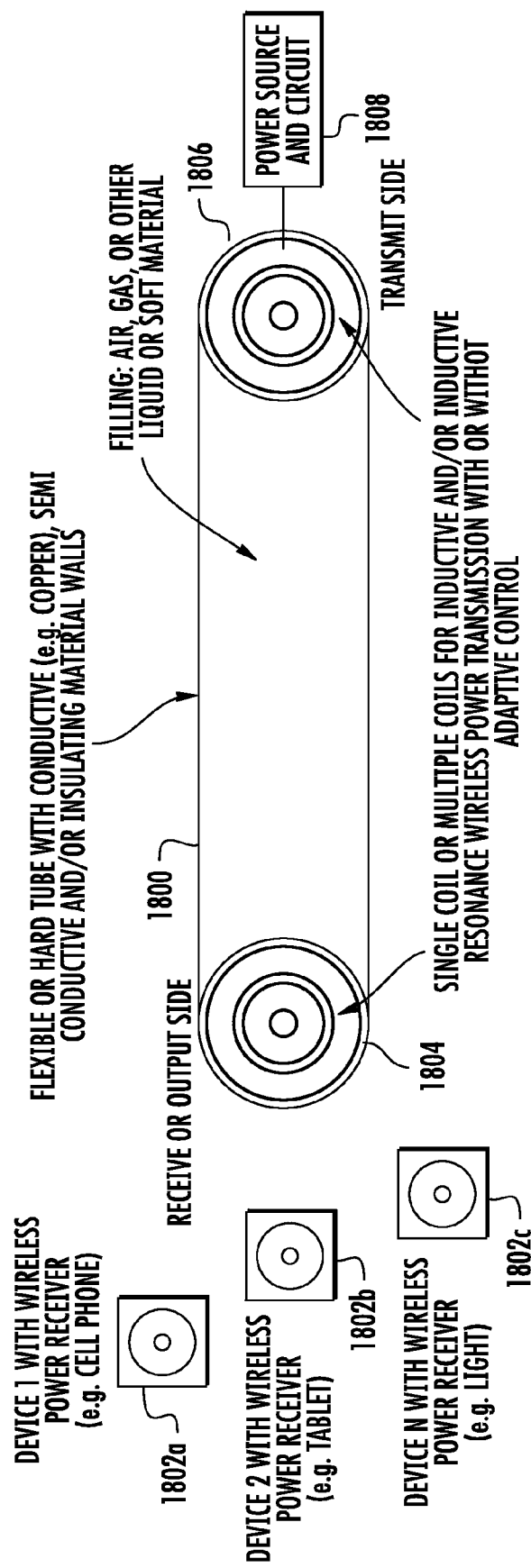
FIG. 17 illustrates an exemplary embodiment of a tube structure for wireless power transmission.

Description will now be provided with reference to additional embodiments that include a tube structure for directing wireless power. One example of the tube structure is shown in FIG. 17 and may allow more efficient transmission to wireless devices. Tube structure 1800 may also provide wireless power transfer over longer distances by providing a conductive medium, other than just atmospheric air, in which to direct and relay wireless power.

Tube structure 1800 may include one or more coils 1806 and/or antennas placed on one side of a tube structure, which could be of any shape such as cylindrical or square, to transmit wireless power partially or completely through the tube 1800. A power source and circuit 1808 may provide power to the transmit side 1806 through a wired connection, a wireless connection wireless power transfer, or any combination of the two. The power source and circuit 1808 may also be a battery or other power storage device that is itself recharged either through a wired or wireless recharging process as previously described.

Tube 1800 may be flexible or hard. The walls of tube 1800 may be a conductive material, such as copper. In another exemplary embodiment, the walls of tube 1800 may be semi-conductive or even insulating materials. Tube 1800 may be filled with air, gas, or other materials, including a liquid, semi-liquid, semi-solid, or solid material depending on the conductivity desired for a particular application.

At the other end of the tube, one or more receiver coils 1804 may receive power and provide the power to a load, a device, or amplify the wireless energy for a further transmission to other devices. Although a single receiver coil 1804 and transmitter coil 1806 have been illustrated, multiple coils with disconnecting drive loops and load loops, as previously described, may also be used.

The receiver 1804 may transmit wireless power to a plurality of devices 1802*a-c*. Devices 1802*a-c* may include a wireless power receiver that receives power from the receiver 1804 that outputs the power. Devices 1802*a-c* may be a consumer electronic device, including, for example, a cell phone, tablet, light, laptop, keyboard, mouse, display, and others. The area near tube output on the receiver or output side 1804 may be movable and flexible so as to retain its shape once adjusted. Accordingly, the power transmission may be directed to different directions, such as in the direction of the devices to be wirelessly charged or powered.

Figure 18:
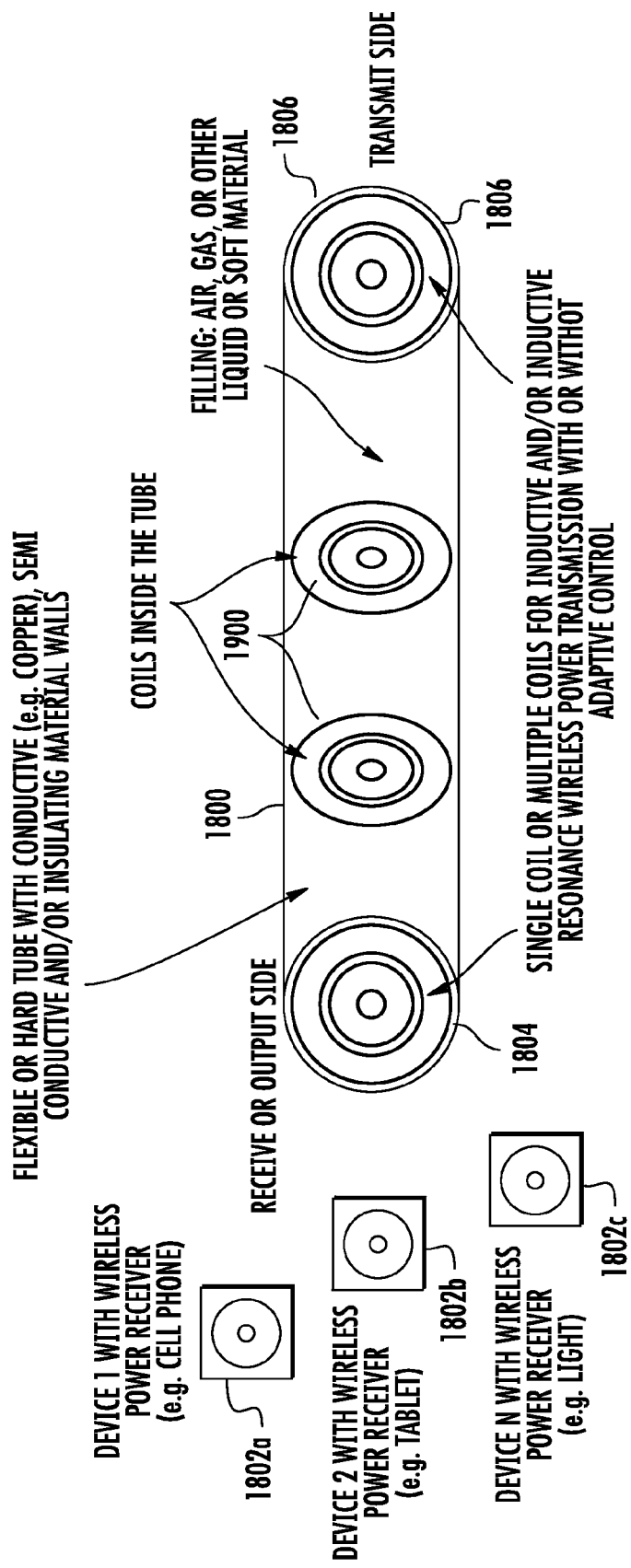
FIG. 18 illustrates a second exemplary embodiment of a tube structure for wireless power transmission.

FIG. 18 illustrates another exemplary embodiment. In this embodiment, tube 1800 includes multiple coils 1900 within the tube. The coils 1900 within the tube may act to receive and relay power through the tube 1900 and ultimately on to wireless devices 1802a-c to be charged. Coils 1900 may be spaced at equal distances as shown in FIG. 18 throughout the tube 1800. However, coils 1900 may also be placed at varying differences. For example, a coil 1900 near the transmission coil 1806 may be placed at a relatively far distance from transmit side 1806. The next coil 1900 may be slightly closer to the first coil 1900 than the first coil 1900 is to the transmit coil 1806. This process may repeat itself. The initial power transmission from 1806 may provide a high efficiency, which may drop as the power is transmitted through tube 1900. Therefore, in one exemplary embodiment, subsequent coils may be placed closer to continue receiving and retransmitting efficient amounts of power while minimizing losses associated with retransmitting wireless power. The coils could also be rotated manually or adaptively/automatically with different orientations and several of their drive loops could be connected and disconnected, similar to the prior embodiments.

Figure 19:
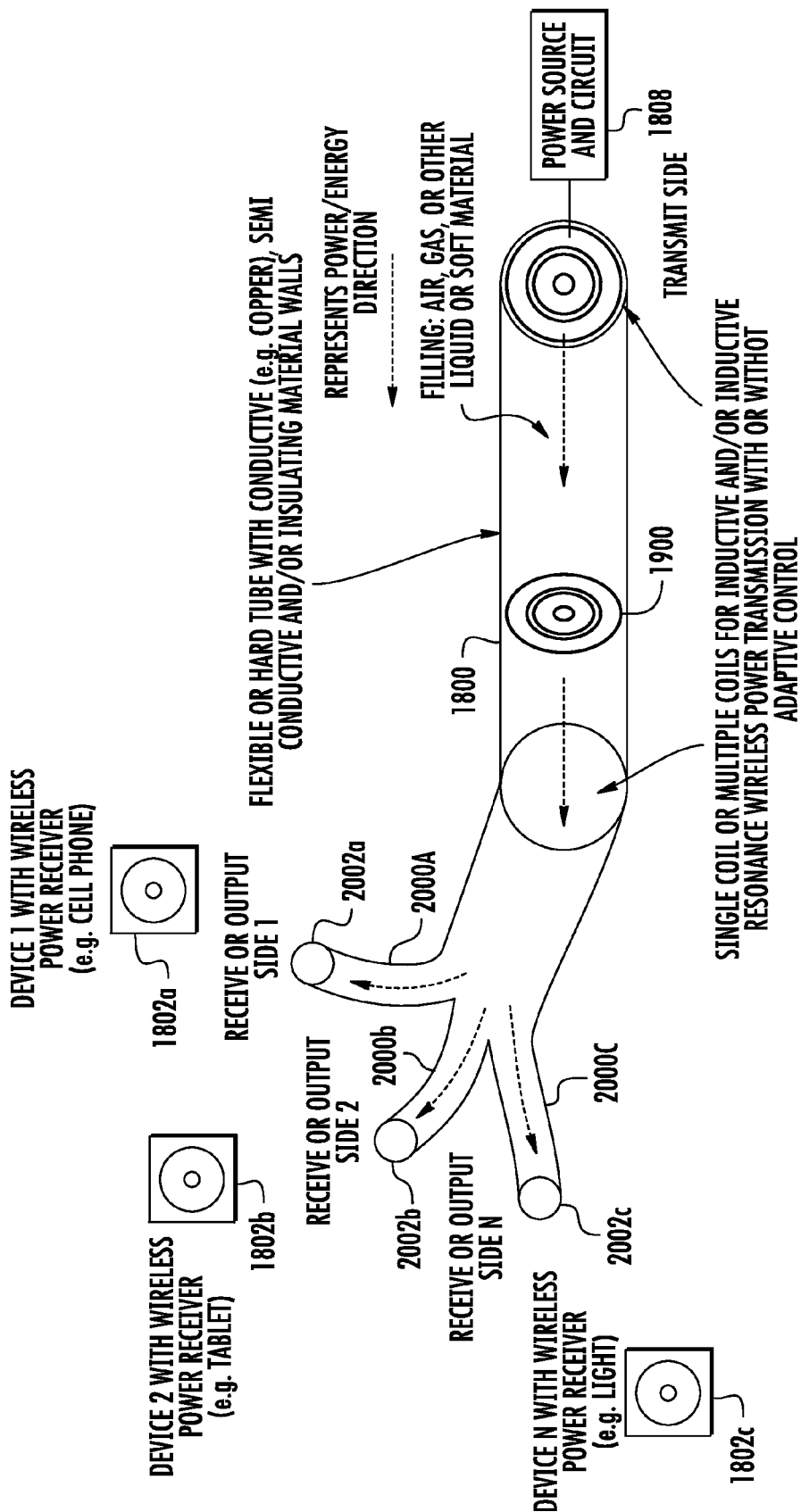
FIG. 19 illustrates a third exemplary embodiment of a tube structure for wireless power transmission.

FIG. 19 illustrates another exemplary embodiment of a tube structure 1800. As with the embodiments illustrated in FIGS. 17 and 18, tube structure may include transmit coils 1806 and optionally additional coils 1900 to relay power. In the embodiment of FIG. 19, however, the tube structure may split into a plurality of tube structures as shown by branches 2000a-c. The branches 2000a-c may be located at the output of the tube 1800 to direct wireless power at various electronic devices. When some wireless power transmission systems are not aligned, the efficiency of wireless power transmission drops rapidly. Branches 2000a-c therefore direct and align wireless power transmission at devices 1802a-c to optimize power transfer.

Branches 2000a-c may continue for equal or different distances. Although not illustrated, branches 2000a-c may also include additional coils 1900 within the branch to relay wireless power. Branches 2000a-c may terminate with receiver or output coils 2002a-c to provide wireless power transmission to devices 1802a-c. The receiver or output coils 2002a-c may be the same or different sizes and may charge or power devices at different locations. In addition, multiple coils 2002a-c may be directed to a single device to provide enhanced wireless recharging.

Figure 20:
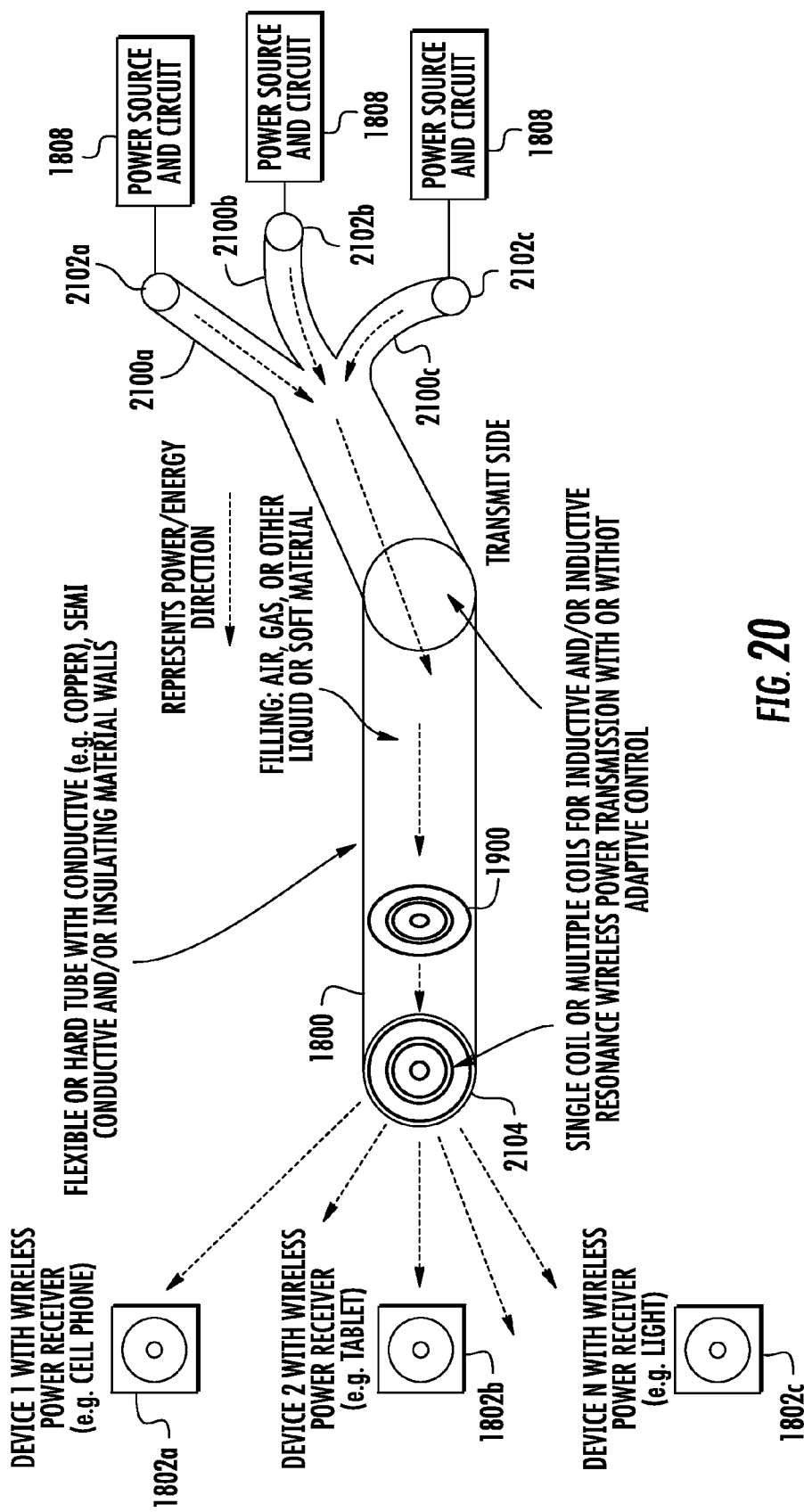
FIG. 20 illustrates a fourth exemplary embodiment of a tube structure for wireless power transmission.

FIG. 20 illustrates another exemplary embodiment. In this embodiment, a plurality of branches 2100a-c may be provided, with each being connected to a power source and circuit 1808 through receivers 2102a-c. Branches 2100a-c may be of the same of different length. Each branch may receive power from a different power source and circuit 1808, from the same power source and circuit 1808, or some branches may share a power source and circuit 1808 while others do not. The branches may received the same or different amount of power relative to each other. The connections to power source and circuit 1808 may be the same, such as inductive power, or may vary. For example, some connections may be wired, others wireless magnetic recharging, others offer a solar power connection, and others may receive RF energy. These examples of power source and circuit 1808 should be considered exemplary in nature and not limiting.

In FIGS. 19 and 20, the branches 2000a-c and 2100a-c are shown as joining at a common junction. However, the branches 2100a-c may also join tube 1800 at different locations to boost power throughout the tube. Similarly, tube 1800 may include branches 2000a-c that do not stem from a common junction but instead are spaced throughout tube 1800. Branches 2000a-c, coils 2002a-c, branches 2100a-c, and coils 2102a-c may have the same or different sizes. Moreover, the coils 2002a-c and coils 2102a-c may operate at the same or different frequencies. In one embodiment, differing frequencies may be used to provide broad spectrum wireless power transmission. The embodiments of FIGS. 19 and 20 may also be combined, so that a tube 1800 includes branches 2100a-c on the transmitting side and branches 2000a-c on the receiver or output side.

The diameter or cross section of tube 1800 shown in FIGS. 17-20 may be uniform or non-uniform. The coils at the transmitter sides 1806 and 2102a-c and receiver sides 1804, 2002a-c, and 2104 may have multiple drive loops that are adaptively connected and disconnected as disclosed previously. Moreover, in one exemplary embodiment, the coils can also be adaptively rotated at the sides of the tubes and inside the tubes to more efficiently direct wireless power transfer. The methods described above to connect and disconnect coils and also optionally include RF power transmission may be used with any of the embodiments described in FIGS. 17-20.

The embodiments in FIGS. 17-20 are exemplary in nature and have a variety of applications. For example, the coils of the transmitter system can be placed inside a car cockpit such as under the seats, under the ceiling of the car, and/or in the car dash. Tubing 1800 may then be placed to surround the coils. For example, tubing 1800 may be provided within the inside of the car ceiling above a headliner and along the floor under a carpet. In this manner, tubing 1800 may be placed throughout a vehicle to power wireless devices so that, for example, a cell phone can wirelessly recharge while it is in the vehicle. While an example of providing tubing 1800 in a vehicle has been provided, tubing 1800 may also be placed, for example, inside the walls of a room, cabinetry, an airplane cockpit, or a train.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer readable medium may be transmitted using any appropriate medium, including but not limited to wireless, wireline, optical fiber cable, RF, etc., or any suitable combination of the foregoing.

Computer program code for may be written in any combination of one or more programming languages, including an object oriented programming language such as Java, Smalltalk, C++, or the like, and conventional procedural programming languages, such as the "C" programming language or similar programming languages. The program code may execute entirely on the computing unit.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

What is claimed is:

1. A transmitter that transmits wireless power, comprising:
   a radio frequency antenna configured to transmit wireless power;
   a magnetic inductive coil configured to transmit wireless power;
   a plurality of drive loops;
   one or more switches connected to the plurality of drive loops and the radio frequency antenna; and
   a controller configured to connect or disconnect one or more of the plurality of drive loops using the one or more switches and connect or disconnect the radio frequency antenna using the one or more switches, wherein the controller is configured to operate the one or more switches based, at least in part, on a distance between the transmitter and a receiver.

2. The transmitter of claim 1, wherein the controller determines whether to connect or disconnect one or more of the plurality of drive loops based on at least one of an amount of power transmitted, an amount of power received by the receiver, or an efficiency comparing the amount of power transmitted to the amount of power received.

3. The transmitter of claim 1, wherein the transmitter transmits the wireless power to the receiver, and wherein the receiver is configured to tilt itself toward the transmitter when the transmitter and the receiver are laterally misaligned.

4. The transmitter of claim 1, wherein the transmitter is included on a robot.

5. The transmitter of claim 4, wherein:
   the robot is an unmanned aerial vehicle, and
   the transmitter transmits the wireless power to a receiver on a second unmanned aerial vehicle.

6. The transmitter of claim 1, further including a solar panel for receiving solar power.

7. The transmitter of claim 1, wherein the controller connects or disconnects portions of the magnetic inductive coil.

8. The transmitter of claim 1, wherein the transmitter is integrated into a battery or one or more fan blades.

9. The transmitter of claim 1, wherein at least one of the magnetic inductive coil, the plurality of drive loops, or the radio frequency antenna are incorporated into a tube structure.

10. The transmitter of claim 9, wherein the tube structure comprises a plurality of branches.

11. A receiver that receives wireless power, comprising:
    a radio frequency antenna configured to receive wireless power;
    a magnetic inductive coil configured to receive wireless power;
    a plurality of load loops;
    one or more switches connected to the plurality of load loops and the radio frequency antenna; and
    a controller configured to connect or disconnect one or more of the plurality of load loops using the one or more switches and connect or disconnect the radio frequency antenna using the one or more switches, wherein the controller is configured to operate the one or more switches based, at least in pan, on a distance between the receiver and a transmitter.

12. The receiver of claim 11, wherein at least one of the magnetic inductive coil, the plurality of load loops, or the radio frequency antenna are incorporated into a tube structure.

13. The receiver of claim 12, wherein the tube structure comprises a plurality of branches.

14. A method for transmitting wireless power, comprising:
    connecting one or more drive loops to a source using one or more switches;
    connecting a radio frequency antenna to the source using the one or more switches;
    providing power from the source through the one or more switches; and
    transmitting the wireless power through the one or more drive loops and a magnetic inductive coil; and
    transmitting the wireless power through the radio frequency antenna, wherein the one or more switches are operated based, at least in part, on a distance between a transmitter and a receiver.

15. The method of claim 14, further including:
    determining whether to connect or disconnect the one or more drive loops based on at least one of an amount of power transmitted, an amount of power received by the receiver, or an efficiency comparing the amount of power transmitted to the amount of power received.

16. The method of claim 14, further including:
    detecting that the transmitter is laterally misaligned from the receiver;
    tilting the receiver toward the transmitter;
    transmitting the power using the transmitter; and
    receiving the power at the receiver.

17. The method of claim 14, wherein the power is transmitted from a first unmanned aerial vehicle to a second unmanned aerial vehicle.

18. The method of claim 14, further including connecting or disconnecting portions of the magnetic inductive coil.

19. A system for transmitting wireless power, comprising:
    a transmitter that transmits wireless power, the transmitter including:
        a radio frequency antenna configured to transmit wireless power;
        a magnetic inductive coil configured to transmit wireless power;
        a plurality of drive loops;
        one or more switches connected to the plurality of drive loops and the radio frequency antenna;
    a receiver that receives the wireless power, the receiver including:
        a receiving radio frequency antenna configured to receive wireless power;
        a receiving magnetic inductive coil configured to receive wireless power;
        a plurality of load loops;
        one or more receiving switches connected to the plurality of load loops and the receiving radio frequency antenna; and one or more controllers that control the one or more switches and the one or more receiving switches, wherein the one or more controllers are configured to operate the one or more switches and the one or more receiving switches based, at least in part, on a distance between the transmitter and the receiver.

20. The system of claim 19, wherein the one or more controllers determine whether to connect or disconnect one or more of the plurality of drive loops based on at least one of an amount of power transmitted, an amount of power received by the receiver, or an efficiency comparing the amount of power transmitted to the amount of power received.

21. The system of claim 19, further comprising a tube structure, wherein at least a portion of the transmitter or at least a portion of the receiver are incorporated into the tube structure.

22. The system of claim 21, wherein the tube structure comprises a plurality of branches.

* * * * *